US012491133B2

(12) United States Patent
Dionigi

(10) Patent No.: US 12,491,133 B2
(45) Date of Patent: Dec. 9, 2025

(54) DEFORMABLE CONTAINER, KIT AND PACKAGING

(71) Applicant: DOMPÉ FARMACEUTICI S.P.A., Milan (IT)

(72) Inventor: Giuseppe Dionigi, Foligno (IT)

(73) Assignee: DOMPÉ FARMACEUTICI S.P.A., Milan (IT)

( * ) Notice: Subject to any disclaimer, the term of this patent is extended or adjusted under 35 U.S.C. 154(b) by 104 days.

(21) Appl. No.: 18/289,432

(22) PCT Filed: May 3, 2022

(86) PCT No.: PCT/EP2022/061844
§ 371 (c)(1),
(2) Date: Nov. 3, 2023

(87) PCT Pub. No.: WO2022/233866
PCT Pub. Date: Nov. 10, 2022

(65) Prior Publication Data

US 2024/0252396 A1 Aug. 1, 2024

(30) Foreign Application Priority Data

May 7, 2021 (IT) ........................ 102021000011387

(51) Int. Cl.
*A61J 1/06* (2006.01)
*A61J 1/14* (2023.01)
(Continued)

(52) U.S. Cl.
CPC ............. *A61J 1/067* (2013.01); *A61J 1/1406* (2013.01); *A61J 1/2048* (2015.05); *A61J 7/0046* (2013.01)

(58) Field of Classification Search
CPC ........ A61J 1/067; A61J 1/1406; A61J 1/2048; A61J 7/0046
See application file for complete search history.

(56) References Cited

U.S. PATENT DOCUMENTS 5,169,388 A 12/1992 McPhee
5,941,867 A 8/1999 Kao
(Continued)

FOREIGN PATENT DOCUMENTS

DE 102006009611 9/2007
EP 0702968 3/1996
(Continued)

OTHER PUBLICATIONS

PCT International Search Report for PCT/EP2022/061844 dated Aug. 17, 2022 (10 pages).

*Primary Examiner* — Timothy L Maust
(74) *Attorney, Agent, or Firm* — Mueting Raasch Group

(57) ABSTRACT

A deformable container for dispensing a medical substance comprising a body defining an internal volume configured to receive a fluid substance, said body comprising a filling access configured to receive the fluid substance, a dispensing outlet configured to dispense the fluid substance, a valve arranged at the filling access movable between an open configuration and a closed configuration. The body comprises an elastically deformable wall delimiting the internal volume. The disclosure further relates to a connecting accessory comprising a first coupling portion, configured to fluidly connect to the filling access of the deformable container, and a second coupling portion configured to fluidly connect to an internal compartment of a vial. The container and the connecting accessory are configurable in a coupled configuration wherein the connecting accessory is coupled to the filling access of the container, and the valve of the container is in the open configuration.

25 Claims, 11 Drawing Sheets

(51) Int. Cl.

| | |
|---|---|
| ***A61J 1/20*** | (2006.01) |
| ***A61J 7/00*** | (2006.01) |

(56) References Cited

U.S. PATENT DOCUMENTS

| | | | | |
|---|---|---|---|---|
| 6,875,205 | B2 * | 4/2005 | Leinsing | A61M 39/10<br>604/905 |
| 8,343,113 | B2 * | 1/2013 | Hokanson | A61M 39/045<br>604/256 |
| 9,795,536 | B2 * | 10/2017 | Lev | A61J 1/2048 |
| 2004/0182471 | A1 | 9/2004 | Hansen | |
| 2009/0025823 | A1 | 1/2009 | Hansen | |
| 2022/0151872 | A1 * | 5/2022 | Gobbi Frattini | A61J 1/1412 |

FOREIGN PATENT DOCUMENTS

| | | |
|---|---|---|
| JP | 0824312 | 1/1996 |
| WO | WO 01/74291 | 10/2001 |
| WO | WO 03/008021 | 1/2003 |
| WO | WO 2011/104711 | 9/2011 |
| WO | WO 2012/004784 | 1/2012 |
| WO | WO 2012/052853 | 4/2012 |
| WO | WO 2017/001921 | 1/2017 |
| WO | WO 2017/203511 | 11/2017 |

* cited by examiner

Fig. F

DEFORMABLE CONTAINER, KIT AND PACKAGING

This application is a U.S. National Stage Application of International Application No. PCT/EP2022/061844 filed May 3, 2022, which was published in English on Nov. 10, 2022, as International Publication No. WO 2022/233866 A1. International Application No. PCT/EP2022/061844 claims priority to Italian Application No. 102021000011387 filed May 7, 2021.

FIELD OF THE INVENTION

The present invention relates to a deformable container configured to receive a fluid, i.e. a liquid, for subsequent dispensing.

The present invention also relates to a connecting accessory configured to connect in a fluid communication manner the deformable container with a vial, wherein the latter may contain a medicament, i.e. a liquid solution or a drug in powder form. Notably, the present invention relates to the medical field and drug administration and is within the field of devices for transferring liquids for medical use from a glass vial to the deformable container for their administration.

The present invention further relates to a kit comprising the deformable container and the connecting accessory.

The present invention further relates to a packaging containing the deformable container with or without the connecting accessory.

Lastly, the present invention further relates to a method for connecting the deformable container to the vial through the connecting accessory. More specifically, the invention refers to the transfer of liquids to be administered as nasal sprays, oral drops, or eye drops, through the compression of a (e.g., plastic squeeze) deformable container.

BACKGROUND

Deformable plastic containers for medical use comprise deformable walls, which, when pressure is applied, allow predefined doses of liquid (solutions or suspensions) to be released in the form of droplets or sprays.

However, filling in plastic deformable containers requires specific production lines, and some companies may prefer to use their own glass vial lines, such as in the case of small batch production for clinical trials.

In addition, in some cases the material of the deformable containers, usually based on polyethylene or polypropylene, is not suitable to be in contact with the medical liquid throughout the required shelf life (i.e., to support the so-called long-term stability).

Although there are devices that simplify the transfer of liquid between a glass vial and a syringe (e.g., WO2012004784A1) or between two glass vials (e.g., WO2017203511A1 or WO2011104711A1) without the use of needles, to date there are no devices capable of transferring such liquid to a deformable multi-dose container using the same compression system that will later be used to deliver aliquots of the liquid for administration by ensuring maintenance of sterility at each step.

DE102006009611 describes a system for preparing and making available a flowable medium formed by mixing a dry substance with a medium for therapeutic purposes; the system includes a) a first container receiving the fluid and has a wall part able to deform counter to a restoring force to change the container volume, b) a second container receiving the dry substance, and c) a transfer device for producing a fluid communication between the first container and the second container.

EP0702968 shows an accordion container for chemical that has a part for extracting a chemical at one end of the main body of the according container. At the other end of the main body, a one-way valve and a hook of a bending type are provided. A chemical can be injected into and extracted from the main body through the one-way valve.

AIM OF THE INVENTION

The aim of this invention is to at least partially solve one or more of the drawbacks and/or limitations of the previous technical solutions.

A first goal is to provide a deformable container for housing a liquid solution in a secure manner, particularly a medical solution free from preservatives.

An aim is to provide a deformable container configured to receive the solution and to keep the solution safe in order to maintain over time the solution properties, in particular to increase the lifetime of the liquid solution.

A further object is to provide a deformable container configured to receive the solution and able to deliver the solution from time to time as needed by the user, i.e. to provide a suitable multi-dose delivery container.

A further object is to provide a deformable container and a connecting accessory to facilitate the solution transfer from a vial to the deformable container for a subsequent delivery from the deformable container.

A further object is to provide a deformable container and a connecting accessory able to allow solution transfer from a vial to the deformable container in a sterile manner to avoid contamination of the solution during transfer thereof.

A further object is to provide a deformable container and a connecting accessory able to further reduce risks of contamination of the solution during transfer from the vial to the deformable container.

A further aim is to provide a deformable container and a connecting accessory able to make solution transfer from the vial to the deformable container quick and safe.

A further aim is to provide a deformable container and a connecting accessory able to make solution transfer from the vial to the deformable container sterile, in order to maximize lifetime of the solution in the deformable container.

A further goal is to provide a deformable container and a connecting accessory so that the above-mentioned objectives may be easily and safely achieved, during use, by a person not skilled in the art.

These objects and more, which will appear more from the following description, are substantially achieved by a deformable container and a connecting accessory in accordance with one or more of the following claims and/or aspects.

SUMMARY SECTION

A 1st aspect refers to a deformable container (1) for dispensing a medical substance, the deformable container (1) comprising a body (2) defining an internal volume (3) configured to receive a fluid substance (4), said body (2) comprising;

- a filling access (8) configured to receive the fluid substance (4) for filling the internal volume (3) of the body (2);

a dispensing outlet (10) configured to dispense, from the internal volume (3), an amount of the fluid substance (4);

a valve (20) arranged at the filling access (8) and movable between:

an open configuration wherein said valve (20) allows fluid passage through said filling access (8), and a closed configuration wherein said valve (20) prevents fluid passage through said filling access (8);

and wherein the body (2) comprises at least one elastically deformable wall delimiting the internal volume (3). A 2nd aspect refers to a deformable container (1) for dispensing a medical substance, the deformable container (1) comprising a body (2) defining an internal volume (3) configured to receive a fluid substance (4), said body (2) comprising;

a filling access (8) configured to receive the fluid substance (4) for filling the internal volume (3) of the body (2);

a dispensing outlet (10) configured to dispense, from the internal volume (3), an amount of the fluid substance (4);

a valve (20) arranged at the filling access (8) and movable between:

an open configuration wherein said valve (20) allows fluid passage through said filling access (8), and a closed configuration wherein said valve (20) prevents fluid passage through said filling access (8).

A 3rd aspect refers to a kit (50) comprising:

a deformable container (1) for dispensing a medical substance, the deformable container (1) comprising a body (2) defining an internal volume (3) configured to receive a fluid substance (4), said body (2) comprising;

a filling access (8) configured to receive the fluid substance (4) for filling the internal volume (3) of the body (2);

a dispensing outlet (10) configured to dispense, from the internal volume (3), an amount of the fluid substance (4);

a valve (20) arranged at the filling access (8) and movable between:

an open configuration wherein said valve (20) allows fluid passage through said filling access (8), and a closed configuration wherein said valve (20) prevents fluid passage through said filling access (8);

wherein the body (2) comprises at least one elastically deformable wall delimiting the internal volume (3);

a connecting accessory (51) comprising:

a first coupling portion (52) configured to fluidly connect to the filling access (8) of the deformable container (1), and a second coupling portion (60) configured to fluidly connect to an internal compartment (102) of a vial (101), in particular wherein the internal compartment (102) of the vial (101) houses the fluid substance (4), an internal passage (70) putting the first coupling portion (52) in fluid communication with the second coupling portion (60) and vice versa, the kit (50) being configurable in a coupled configuration wherein:

the first coupling portion (52) of the connecting accessory is coupled to the filling access (8) of the container (1), and the valve (20) of the container (1) is in the open configuration so that the internal volume (3) of the container (1) is in fluid communication with the second coupling portion (60) of the connecting accessory (51), in particular wherein the internal volume (3) of the container (1) is in fluid communication with the compartment (102) of the vial (101).

A 4th aspect refers to an assembly (100) comprising:

the kit (50) according to the preceding aspect; and a vial (101) defining a compartment (102) for containing a substance, said assembly (100) being configurable in an assembled configuration wherein:

the deformable container (1) and the connecting accessory (51) are in the coupled configuration, and the second coupling portion (60) of the connecting accessory (51) is connected to the vial (101);

and wherein in the assembled configuration the internal volume (3) of the deformable container (1) is in fluid communication with the compartment (102) of the vial (101) through said connecting accessory (51).

A 5th aspect refers to an assembly (100) including a kit (50) comprising:

a deformable container (1) for dispensing a medical substance, the deformable container (1) comprising a body (2) defining an internal volume (3) configured to receive a fluid substance (4), said body (2) comprising;

a filling access (8) configured to receive the fluid substance (4) for filling the internal volume (3) of the body (2);

a dispensing outlet (10) configured to dispense, from the internal volume (3), an amount of the fluid substance (4);

a valve (20) arranged at the filling access (8) and movable between:

an open configuration wherein said valve (20) allows fluid passage through said filling access (8), and a closed configuration wherein said valve (20) prevents fluid passage through said filling access (8);

wherein the body (2) comprises at least one elastically deformable wall delimiting the internal volume (3); and a connecting accessory (51) comprising:

a first coupling portion (52) configured to fluidly connect to the filling access (8) of the deformable container (1), and a second coupling portion (60) configured to fluidly connect to an internal compartment (102) of a vial (101), in particular wherein the internal compartment (102) of the vial (101) houses the fluid substance (4), an internal passage (70) putting the first coupling portion (52) in fluid communication with the second coupling portion (60) and vice versa, the kit (50) being configurable in a coupled configuration wherein:

the first coupling portion (52) of the connecting accessory is coupled to the filling access (8) of the container (1), and the valve (20) of the container (1) is in the open configuration so that the internal volume (3) of the container (1) is in fluid communication with the second coupling portion (60) of the connecting accessory (51), in particular wherein the internal volume (3) of the container (1) is in fluid communication with the compartment (102) of the vial (101);

and wherein the assembly (100) further comprises a vial (101) defining a compartment (102) for containing a substance, said assembly (100) being configurable in an assembled configuration wherein:

the deformable container (1) and the connecting accessory (51) are in the coupled configuration, and the second coupling portion (60) of the connecting accessory (51) is connected to the vial (101);

and wherein, in the assembled configuration, the internal volume (3) of the deformable container (1) is in fluid communication with the compartment (102) of the vial (101) through said connecting accessory (51).

A 6th aspect relates to method (200) for moving a fluid substance (4) in a deformable container (1), said method (200) comprising at least the following steps:

providing (201) an assembly (100) according to any one of the preceding aspects;

connecting (202) the filling access (8) of the deformable container (1) to the first coupling portion (52) of the connecting accessory (51);

connecting (203) the second coupling portion (60) of the connecting accessory (51) to the vial (101) to define the assembled configuration;

squeezing (204), in particular manually squeezing, the deformable container (1) to reduce the internal volume (3);

releasing (205) the deformable container (1) to allow elastic return of the body (2) of the deformable container (1);

optionally sequentially repeating the steps of squeezing and releasing until the fluid substance (4) is completely moved into the deformable container (1).

In a 7th aspect according to any one of the preceding aspects, the internal volume (3) of the container (1) is substantially independent on the presence or absence of fluid substance (4).

In a 8th aspect according to any one of the preceding aspects, the at least one elastically deformable wall delimiting the internal volume (3) is made of an elastic material, in particular said material being at least one between silicone, rubber, plastic. Preferably the material is plastic and the container body may exclusively consist of plastic. A possible alternative is also a multi-material container including more than one material from silicone, rubber, plastic, or other deformable and elastic materials.

In a 9th aspect according to any one of the preceding aspects, the at least one elastically deformable wall has a thickness comprised between 0.5 mm and 0.9 mm.

For example a deformable container made of low-density polyethylene (LDPE) may have a thickness within the above range, for example of 0.7 mm.

In a 10th aspect according to any one of the preceding aspects, a deformation of the body (2) at the at least one elastically deformable wall determines a reduction of the internal volume (3).

In a 11th aspect according to any one of the preceding aspects, squeezing the body (2) at the at least one elastically deformable wall determines a reduction of the internal volume (3).

In a 12th aspect according to any one of the preceding aspects, the at least one elastically deformable wall of the body (2) of the container (1) is a lateral wall (7).

In a 13th aspect according to any one of the preceding aspects, the body (2) of the deformable container (1) is configured to restore an original shape after being squeezed.

In a 14th aspect according to any one of the preceding aspects, the body (2) of the deformable container (1) has an original shape at rest defining a predefined size of the internal volume (3), in particular when the container (1) is free of external loads, for example when the container (1) is not squeezed by a user.

In a 15th aspect according to any one of the preceding aspects, the body of the deformable container (1) has a squeezed shape defining a reduced size of the internal volume (3) when the body (2) is squeezed by a user, in particular wherein the reduced size of the internal volume (3) is smaller than the predefined size of the internal volume (3).

In a 16th aspect according to any one of the preceding aspects, the at least one elastically deformable wall of the container (1) is configured to elastically return from the squeezed shape to the original shape after a user releases the body (2) from squeezing.

In a 17th aspect according to any one of the preceding aspects, the valve (20) is a self-sealing valve (20) configured to keep the closed position in a rest condition.

In a 18th aspect according to any one of the preceding aspects, the valve (20) is configured to move from the closed position into the open condition when a connecting accessory (51) couples to the filling access (8) of the deformable container (1).

In a 19th aspect according to any one of the preceding aspects, a connection between the filling access (8) and the connecting accessory (51) determines a switch of the valve (20) from the closed position to the open position.

In a 20th aspect according to any one of the preceding aspects, a disconnection between the filling access (8) and the connecting accessory (51) determines a switch of the valve (20) from the open position to the closed position.

In a 21st aspect according to any one of the preceding aspects, the valve (20) is arranged inside the filling access (8).

In a 22nd aspect according to any one of the preceding aspects, the filling access (8) defines a collar (9) surrounding said valve (20), in particular said collar (9) entirely surrounding said valve (20).

In a 23rd aspect according to any one of the preceding aspects, the valve (20) comprises an elastically deformable member (21) which determines the passage between the closed and the open position.

In a 24th aspect according to any one of the preceding aspects, the valve (20), in particular the deformable member (21), is made of an elastically deformable material, in particular said elastically deformable member (21) being made of at least one between silicone and rubber.

In a $24^{th}$ bis aspect according to any one of the preceding aspects 1 to 23, the valve (20) comprises a mobile body and a spring acting on the mobile body, in absence of external forces, the spring acting against the mobile body to keep the valve in the closed position. Notably, when the connecting accessory is coupled to the deformable body, a protrusion (54) acts on the mobile body and overcomes the spring force (moving the deformable body) thereby opening the valve (20).

In a 25th aspect according to any one of the preceding aspects, the valve (20) comprises a deformable member (21) having a slit (22), said slit (22) opening fluid passage upon coupling of the filling access (8) to a connecting accessory (51), and closing fluid passage when the filling access (8) is disconnected.

In a 26th aspect according to any one of the preceding aspects, the deformable member (21) of the valve (20) is configured to deform when the filling access (8) is coupled to the connecting accessory (51), said deformation causing the slit (22) to open.

In a 27th aspect according to any one of the preceding aspects, the valve (20) is configured to be pressed by the connecting accessory (51) when the filling access (8) is coupled to the connecting accessory (51).

In a 28th aspect according to any one of the preceding aspects, the filling access (8) defines a collar (9) surrounding said valve (20), the collar having a rigid rim defining an access towards an inside of the access (8), the valve (20) closing the access, in particular the valve (20) is configured to be pressed by the connecting accessory (51) at least partially entering through the rigid rim towards internal volume (3) of the deformable container, when the filling access (8) is coupled to the connecting accessory (51).

In a 29th aspect according to any one of the preceding aspects, the body (2) of the container (1) has an elongated shape.

In a 30th aspect according to any one of the preceding aspects, the body (2) has a cylindrical shape.

In a 31st aspect according to any one of the preceding aspects, the body (2) of the container (1) extends in length along a longitudinal axis (X), and in width along a transversal axis (Y).

In a 32nd aspect according to the preceding aspect, said length is greater than said width, in particular wherein said length is at least 1.5 times than said width, in particular wherein said length is at least 2 times said width, in particular wherein said length is at least 3 times said width.

In a 33rd aspect according to any one of the preceding aspects, the body (2) of the container (1) comprises a first end portion (5) carrying the filling access (8), a second end portion (6) carrying the dispensing outlet (10), and a lateral wall (7) interposed between said first end portion (5) and said second end portion (6).

In a 34th aspect according to the preceding aspect, the filling access (8) and the dispensing outlet (10) are opposite each other with respect to the lateral wall (7) of the body (2) of the container (1).

In a 35th aspect according to any one of the preceding aspects, the filling access (8) and the dispensing outlet (10) are aligned each other along a common axis.

In a 36th aspect according to any one of the preceding aspects, the body (2) defines a longitudinal axis (X) extending along a length of the body (2) and optionally parallel to the lateral wall (7).

In a 37th aspect according to the preceding aspect, the lateral wall (7) extends in length along said longitudinal axis X.

In a 38th aspect according to any one of the preceding two aspects, the dispensing outlet (10) and the filling access (8) are aligned each other along an axis substantially parallel or coincident to said longitudinal axis (X) of the body (2).

In a 39th aspect according to any one of the preceding aspects, the body (2) of the container (1) has a length comprised between 30 mm and 60/80 mm, and a width or a diameter comprised between 10 mm and 25 mm.

In a 40th aspect according to any one of the preceding aspects, the internal volume (3) of the container (1) is comprised between 3 ml and 15 ml, more in particular between 4 ml and 12 ml.

In a 41st aspect according to any one of the preceding aspects, the body (2) is in one piece.

In a 42nd aspect according to any one of the preceding aspects, the container (1) is a plastic multi-dose squeeze container.

In a 43rd aspect according to any one of the preceding aspects, the dispensing outlet (10) is configured to dispense a plurality of discrete amounts in volume of fluid solution at respective discrete user requests, in particular said discrete amounts being deliverable at discrete time intervals.

In a 44th aspect according to the preceding aspect, the internal volume (3) of the body (2) is larger than each discrete amount in volume dispensed each time by the dispensing outlet (10), in particular the internal volume (3) allows to dispense from 5 to 500 discrete amounts in volume.

In a 44th bis aspect according any one of the preceding aspects, the internal volume (3) of the body (2) is larger than a volume of transferred fluid (e.g., from vial), in particular the internal volume (3) is at least 5 times larger than the volume of transferred fluid, in particular the internal volume (3) is at least 10 times larger than volume of transferred fluid, in particular the internal volume (3) is at least 20 times larger than volume of transferred fluid, in particular the internal volume (3) is at least 30 times larger than volume of transferred fluid.

In a 45th aspect according to any one of the preceding aspects, each discrete amount in volume of fluid substance (4) dispensed by the dispensing outlet (10) is comprised between 0.020 ml and 0.2 ml.

In a 46th aspect according to any one of the preceding aspects, the dispensing outlet (10) is a dropper.

In a 47th aspect according to any one of the preceding aspects, the container (1) further comprises a dispensing accessory (11) connected, or configured to be connected, to the dispensing outlet (10), said dispensing accessory (11) being configured to dispense the fluid substance (4) housed in the internal volume (3).

In a 48th aspect according to any one of the preceding aspects, said dispensing accessory (11) is a dropper or a spray nozzle.

In a 49th aspect according to any one of the preceding aspects, said dispensing accessory (11) is a dropper comprising a housing and an internal membrane (13) arranged inside said housing and acting as a valve (20) for dispensing discrete drops of the fluid substance (4).

In a 50th aspect according to the preceding aspect, said membrane (13) is movable between:

- a sealing position, wherein the membrane (13) prevents fluid communication between the internal volume (3) of the container (1) and the dispensing outlet (10), in particular wherein the fluid substance (4) is prevented from exiting through the dispensing outlet (10) of the container (1),
- a delivery position, wherein the membrane (13) allows fluid communication between the internal volume (3) of the container (1) and the dispensing outlet (10), in particular wherein a discrete amount of fluid substance (4) is allowed from exiting through the dispensing outlet (10) of the container (1).

Main aim of the dispensing accessory of aspects 49-50 is to prevent contamination (from the outside) of the liquid contained in the deformable container during and after each drug dose delivery (even in the absence of preservatives).

In a 51st aspect according to any one of the preceding aspects, the dispensing accessory (11) further comprises an elastic member (14) biasing against the membrane (13) to maintain the sealing position, in particular wherein said elastic member (14) is a metal spring.

In a 52nd aspect according to any one of the preceding aspects, said elastic member (14) is configured to allow the membrane (13) switching from the sealing position to the delivery position based on a predefined pressure within the internal volume (3) of the container (1).

In a 53rd aspect according to any one of the preceding aspects, the container (1) further comprises a cap (15) arrangeable at the dispensing outlet (10), said cap (15) being movable between a covered position wherein the dispensing outlet (10) is covered by the cap (15) and an uncovered position wherein the dispensing outlet (10) is uncovered, and wherein the cap (15) is movable between covered position and the uncovered position and vice versa.

In a 54th aspect according to any one of the preceding aspects, the filling access (8) comprises a threaded coupling (53) portion for connection to the connecting accessory (51).

In a 55th aspect according to any one of the preceding aspects, the filling access (8) protrudes away from the internal volume (3) defining a collar (9), in particular wherein the valve (20) is arranged into said collar (9).

In a 56th aspect according to any one of the preceding aspects, said collar (9) comprises attaching elements (9*a*) for connection to a connecting accessory (51), and wherein said attaching elements (9*a*) comprise one between a thread, a bayonet coupling, a snap-on coupling.

In a 57th aspect according to any one of the preceding aspects, the collar (9) of the filling access (8) comprises an external thread (9*a*) for connection to a connecting accessory (51).

In a 58th aspect according to any one of the preceding aspects, said collar (9) and the body (2) of the container (1) are two distinct pieces assembled together.

In a 59th aspect according to any one of the preceding aspects, the filling access (8) comprises a Luer connector, e.g., a female Luer connector, for connection to the connecting accessory (51).

In a 60th aspect according to any one of the preceding aspects, the container (1) further comprises a removable and re-attachable cap (15) arranged at the dispensing outlet (10).

In a 61st aspect according to any one of the preceding aspects, the internal volume (3) of the container (1) contains a medical fluid, i.e. a saline solution or sterile water or a solvent or a thinner. In the mentioned condition, the medical fluid is then used to reconstitute a lyophile or a dry or powdery drug or a concentrate solution contained in the glass vial.

A 62nd aspect, optionally according to any one of the preceding aspects, relates to a kit (50) comprising:

- a deformable container (1) for dispensing a medical substance, the deformable container (1) comprising a body (2) defining an internal volume (3) configured to receive a fluid substance (4), said body (2) comprising;
  - a filling access (8) configured to receive the fluid substance (4) for filling the internal volume (3) of the body (2);
  - a dispensing outlet (10) configured to dispense, from the internal volume (3), an amount of the fluid substance (4);
  - a valve (20) arranged at the filling access (8) and movable between:
    - an open configuration wherein said valve (20) allows fluid passage through said filling access (8), and
    - a closed configuration wherein said valve (20) prevents fluid passage through said filling access (8);

wherein the body (2) comprises at least one elastically deformable wall delimiting the internal volume (3);

- a connecting accessory (51) comprising:
  - a first coupling portion (52) configured to fluidly connect to the filling access (8) of the deformable container (1), and
  - a second coupling portion (60) configured to fluidly connect to an internal compartment (102) of a vial (101), in particular wherein the internal compartment (102) of the vial (101) houses the fluid substance (4),
  - an internal passage (70) putting the first coupling portion (52) in fluid communication with the second coupling portion (60) and vice versa, the kit (50) being configurable in a coupled configuration wherein:

- the first coupling portion (52) of the connecting accessory is coupled to the filling access (8) of the container (1), and
- the valve (20) of the container (1) is in the open configuration so that the internal volume (3) of the container (1) is in fluid communication with the second coupling portion (60) of the connecting accessory (51), in particular wherein the internal volume (3) of the container (1) is in fluid communication with the compartment (102) of the vial (101).

In a 63rd aspect according to any one of the preceding aspects, in the coupled configuration:

- the first coupling portion (52) of the connecting accessory (51) abuts against the valve (20) of the container (1), and
- the valve (20) of the container (1) is deformed by the first coupling portion (52) of the connecting accessory (51) thereby moving from the closed position to the open position.

In a 64th aspect according to any one of the preceding aspects, in the coupled configuration, the connecting accessory (51) is fluidly interposed between the deformable container (1) and the vial (101).

In a 64th aspect according to any one of the preceding aspects, in the coupled configuration, the connecting accessory (51) is interposed between the deformable container (1) and the vial (101) along the longitudinal axis X.

In a 65th aspect according to any one of the preceding aspects:

- the filling access (8) of the container (1) comprises a threaded coupling (9*a*) portion, and the first coupling portion (52) of the connecting accessory (51) comprises a respective threaded coupling (53) portion for connection to the threaded coupling (9*a*) portion of the filling access (8) of the container (1), and/or
- the filling access (8) of the container (1) and the first coupling portion (52) of the connecting accessory (51) comprise snap on couplings to allow mutual coupling thereof.

In a 66th aspect according to any one of the preceding aspects, the filling access (8) of the container (1) comprises a Luer connector, and the first coupling portion (52) of the connecting accessory (51) comprises a respective Luer connector for connection to the Luer connector of the filling access (8) of the container (1).

In a 67th aspect according to any one of the preceding aspects, the Luer connector of the filling access (8) of the container (1) is a female Luer connector, and the Luer connector of the first coupling portion (52) of the connecting accessory (51) is a male Luer connector.

In a 68th aspect according to any one of the preceding aspects, the male Luer connector of the first coupling portion (52) of the connecting accessory (51) comprises a protrusion (54) that enters a rigid rim of the filling access (8) and abuts, when in the coupled configuration, against the valve (20) of the filling access (8) of the container (1) causing the valve (20) to move in the open position.

In a 69th aspect according to any one of the preceding aspects, the second coupling portion (60) of the connecting accessory (51) comprises a hollow needle (61) for connection to the vial (101), wherein the connecting accessory (51) defines fluid passage through the needle (61), the internal passage (70), and the first and second coupling portions (52, 60).

In a 70th aspect according to any one of the preceding aspects, the second coupling portion (60) of the connecting accessory (51) comprises a collar (62), said collar (62) being configured to couple to a respective portion of the vial (101) to mechanically constrain the connecting accessory (51) to the vial (101).

In a 70th bis aspect according to the preceding aspect, wherein the collar (62) of the second coupling portion (60) of the connecting accessory (51) externally surrounds the needle (61), in particular wherein the needle (61) is completely surrounded by the collar (62) of the second coupling portion (60) of the connecting accessory (51).

In a 71th aspect according to any one of the preceding aspects, the collar (62) of the second coupling portion (60) of the connecting accessory (51) defines a snap-on coupling for connection to the vial (101).

In a 72nd aspect according to any one of the preceding aspects, the collar (62) of the second coupling portion (60) of the connecting accessory (51) comprises two or more flexible walls or fingers (63) configured to expand outwardly during coupling of the second coupling portion (60) to the vial (101), in particular the connecting accessory (51) comprising between three and twelve of said flexible walls or fingers (63), in particular between four and eight.

In a 73rd aspect according to any one of the preceding aspects, the connecting accessory (51) is in a single piece.

In a 74th aspect according to any one of the preceding aspects, the connecting accessory (51) is made of plastic, alternatively wherein the first coupling portion (52), the second coupling portion (60) and the internal passage (70) are made of plastic and the needle (61) is made of metal, i.e. stainless steel. Usually, Polycarbonate (PC) is used to manufacture the connecting accessory (51), for example by injection molding.

In a 75th aspect according to any one of the preceding aspects, the first coupling portion (52) and the second coupling portion (60) of the connecting accessory (51) are aligned along a common connecting axis Z, in particular where the first coupling portion (52), the second coupling portion (60) and the internal passage (70) are aligned along the same connecting axis Z.

In a 75th bis aspect according to any one of the preceding aspects, the connecting accessory (51) does not comprise a valve.

In a 75th ter aspect according to any one of the preceding aspects, the internal passage (70) of the connecting accessory (51) is a channel which puts the first coupling portion (52) in fluid communication with the second coupling portion (60).

In a 75th quater aspect according to any one of the preceding aspects, the first coupling portion (52) is always in fluid communication with the second coupling portion (60).

A 76th aspect, optionally according to any one of the preceding aspects, relates to an assembly (100) comprising:

- the kit (50) according to any one of the preceding aspects; and
- a vial (101) defining a compartment (102) for containing a substance, said assembly (100) being configurable in an assembled configuration wherein:

- the deformable container (1) and the connecting accessory (51) are in the coupled configuration, and
- the second coupling portion (60) of the connecting accessory (51) is connected to the vial (101);

and wherein in the assembled configuration the internal volume (3) of the deformable container (1) is in fluid communication with the compartment (102) of the vial (101) through said connecting accessory (51).

In a 77th aspect according to any one of the preceding aspects, the second coupling portion (60) of the connecting accessory (51) comprises a hollow needle (61) for fluidly connecting the internal passage (70) of the connecting accessory (51) to the compartment (102) of the vial (101), in said assembled configuration said needle (61) protruding inside the compartment (102) of the vial (101).

In a 78th aspect according to any one of the preceding aspects, said vial (101) comprises a diaphragm (110) penetrable by the needle (61) of the connecting accessory (51).

In a 79th aspect according to the preceding aspect, in said assembled configuration, the needle (61) of the connecting accessory (51) passes through the diaphragm (110) of the vial (101).

In an 80th aspect according to any one of the preceding aspects, the diaphragm (110) of the vial (101) is made of an elastic material, in particular rubber or silicone.

In an 81st aspect according to any one of the preceding aspects, the compartment (102) of the vial (101) contains one between the fluid substance (4), a medical liquid, and a substance in powder.

In an 82nd aspect according to any one of the preceding aspects, the vial (101) contains a medical sterile product for ocular use in liquid or powder form.

In an 83rd aspect according to any one of the preceding aspects, the vial (101) comprises a lateral wall (104), a bottom wall, and a top edge (106) opposite to the bottom wall (105).

In an 84th aspect according to the preceding aspect, said diaphragm (110) is arranged at the top edge (106).

In an 85th aspect according to any one of the preceding aspects, the vial (101) comprises a housing (103) defining the internal compartment (102), said housing being made of glass.

In an 86th aspect according to any one of the preceding aspects, the compartment (102) of the vial (101) has a volume comparable or substantially equal to or lower than the internal volume (3) of the deformable container (1).

In an 87th aspect according to any one of the preceding aspects, the volume of the compartment (102) of the vial (101) is comprised between 3 ml and 15 ml, in particular between 4 ml and 12 ml.

In an 88th aspect according to any one of the preceding aspects, the assembly (100), when in the assembled configuration, defines a closed volume defined as a combination of the internal volume (3) of the container (1), the compartment (102) of the vial (101), and the internal passage (70) of the connecting accessory (51).

In an 89th aspect according to any one of the preceding aspects, said closed volume is fluid tight.

In a 90th aspect according to any one of the preceding aspects, when in the assembled configuration, the longitudinal axis X of the container (1), the connecting axis Z of the connecting accessory (51) and the vial axis V of the vial are aligned each other.

A 91st aspect, optionally according to any one of the preceding aspects, relates to a method (200) for moving a fluid substance (4) in a deformable container (1), said method (200) comprising at least the following steps:

- providing (201) an assembly (100) according to any one of the preceding aspects;
- connecting (202) the filling access (8) of the deformable container (1) to the first coupling portion (52) of the connecting accessory (51);

connecting (203) the second coupling portion (60) of the connecting accessory (51) to the vial (101) to define the assembled configuration;

squeezing (204), in particular manually squeezing, the deformable container (1) to reduce the internal volume (3);

releasing (205) the deformable container (1) to allow elastic return of the body (2) of the deformable container (1);

optionally sequentially repeating the steps of squeezing and releasing until the fluid substance (4) is completely moved into the deformable container (1).

In a 92nd aspect according to any one of the preceding aspects, the steps of:

connecting the filling access (8) of the deformable container (1) to the first coupling portion (52) of the connecting accessory (51); and connecting the second coupling portion (60) of the connecting accessory (51) to the vial (101) to define the assembled configuration;

determine the compartment (102) of the vial (101) to be in fluid communication with the internal volume (3) of the deformable container (1) through the connecting accessory (51).

In a 93rd aspect according to any one of the preceding aspects, prior to the step of connecting the filling access (8) of the deformable container (1) to the first coupling portion (52) of the connecting accessory (51), the valve (20) at the filling access (8) of the container (1) is in a closed position.

In a 94th aspect according to any one of the preceding aspects, the step of connecting the filling access (8) of the deformable container (1) to the first coupling portion (52) of the connecting accessory (51) determines the valve (20) of the filling access (8) of the container (1) to move in an open position to allow fluid passage.

In a 95th aspect according to any one of the preceding aspects, the step of connecting the filling access (8) of the deformable container (1) to the first coupling portion (52) of the connecting accessory (51) determines a deformation of a deformable member (21) of the valve (20) of the filling access (8) of the container (1), said deformation causing the valve (20) to move in an open position to allow fluid passage.

In a 96th aspect according to any one of the preceding aspects, the step of connecting the filling access (8) of the deformable container (1) to the first coupling portion (52) of the connecting accessory (51) comprises screwing by rotation the first coupling portion (52) of the connecting accessory (51) on the filling access (8) of the deformable container (1).

In a 97th aspect according to any one of the preceding aspects, the step of connecting the second coupling portion (60) of the connecting accessory (51) to the vial (101) comprises either:

pushing the second coupling portion (60) of the connecting accessory (51) on a top edge (106) of the vial (101); or screwing by rotation the second coupling portion (60) of the connecting accessory (51) to the vial (101).

In a 98th aspect according to any one of the preceding aspects, the step of connecting the second coupling portion (60) of the connecting accessory (51) to the vial (101) comprises penetrating, by a hollow needle (61) arranged at the second coupling portion (60) of the connecting accessory (51), a diaphragm (110) of the vial (101), said step determining the hollow needle (61) to enter in the compartment (102) of the vial (101) to put the compartment (102) of the vial (101) in fluid communication with the internal volume (3) of the container (1).

In a 99th aspect according to any one of the preceding aspects, if the container (1) is initially empty, the step of manually squeezing the deformable container (1) to reduce the internal volume (3) of the container (1) determines passage of gas or air from the internal volume (3) of the container (1) to the compartment (102) of the vial (101), in particular thereby increasing pressure in the vial (101).

In a 100th aspect according to any one of the preceding aspects, if the container (1) initially contains a medical liquid, i.e. a saline solution or sterile water, the step of manually squeezing the deformable container (1) to reduce the internal volume (3) of the container (1) determines passage of said medical liquid from the internal volume (3) of the container (1) to the compartment (102) of the vial (101).

In a 101st aspect according to any one of the preceding aspects, if the container (1) initially contains a medical liquid and the vial (101) initially contains a powder of a substance or another concentrated liquid, the step of manually squeezing the deformable container (1) determines passage of said medical liquid from the internal volume (3) of the container (1) to the compartment (102) of the vial (101) thereby mixing in said compartment (102) the medical liquid with said powder of substance or concentrated liquid, said mixing generating the fluid substance (4).

In a 102nd aspect according to any one of the preceding aspects, the step of releasing the deformable container (1) results in the elastic return of the body (2) of the deformable container (1), said elastic return causing a sucking step wherein the container (1) sucks the fluid substance (4) from the vial (101) to the internal volume (3) of the deformable container (1).

In a 103rd aspect according to any one of the preceding aspects, during the step of manually squeezing the deformable container (1) to reduce the internal volume (3), the method comprises a step of arranging the deformable container (1) above the vial (101).

In a 104th aspect according to any one of the preceding aspects, during the step of releasing the deformable container (1) to allow elastic return of the body (2) of the deformable container (1), the method comprises a step of arranging the vial (101) above the deformable container (1).

In a 105th aspect according to any one of the preceding aspects, the step of manually squeezing the deformable container (1) reduces the internal volume (3).

In a 106th aspect according to any one of the preceding aspects, the method (200) comprises a step of aligning the longitudinal axis X of the deformable container (1) with the vial axis V of the vial (101).

In a 107th aspect according to any one of the preceding aspects, the method (200) comprises a step of aligning the longitudinal axis X of the deformable container (1) with the vial axis V of the vial (101) and with the connecting axis Z of the connecting accessory (51), so that the longitudinal axis X, the vial axis V and the connecting axis Z are coincident each other or parallel each other.

Embodiment of Device with Valve for the Transfer of Liquids

The present embodiment falls within the field of devices for transferring liquids for medical use from a glass vial to another container for their administration. More specifically, the embodiment refers to the transfer of liquids to be administered as nasal sprays, oral drops or eye drops, through the compression of a plastic squeeze container. The embodiment consists of a device composed of a plastic multi-dose squeeze container having on its bottom a bi-directional sealing valve and on its top a liquid dispenser. The valve is luer-activated, i.e. it is opened and remains open when is connected to the top of a vial adapter. The latter, in addition to having a male luer in its upper part to open the device valve and to lock the vial adapter to the device itself, has a needle at its base aimed to penetrate the rubber stopper of a glass vial and access its content. To transfer a liquid from a container to the other, e.g. from the glass vial to the plastic squeeze container, the vial adapter has to be connected to both the device valve and the glass vial. The so assembled system is ready for the liquid transfer and should be oriented by the user so that the glass vial is placed at the top. By squeezing and releasing the sidewalls of the plastic container, the air in the container is forced to enter the glass vial and pushes the liquid contained in it to flow into the plastic squeeze container through the vial adapter's needle and its open valve. Once the liquid has been transferred, the unit consisting of the vial adapter and the glass vial can be detached from the plastic squeeze container, which remains sealed by the device valve. The squeeze container is then ready to be used as a normal squeeze container to release through its dispensing tip, once the cap is removed, doses of liquid in the form of spray or drops. In a different embodiment of the invention, the unit consisting of the device and the vial adapter is supplied as pre-assembled. In this embodiment, the device valve can either stay opened from the beginning (being already connected to the vial adapter) or be open only when the vial adapter is pushed to penetrate the glass vial rubber stopper. This embodiment requires that there is a moving part on top of the vial adapter which simultaneously penetrates the vial stopper and opens the valve of the device, putting the systems in communication for liquid flow. The embodiment is also suitable to facilitate the reconstitution of a powder (or the dilution of a concentrated liquid) contained in the glass vial. In this case, the plastic squeeze container of the device is pre-filled with a diluent and, once connected to the glass vial, the container is squeezed to force the diluent to flow into the glass vial positioned at the bottom. When the diluent has dissolved the powder (or diluted the liquid) contained in the glass vial, the system is turned upside down so that the glass vial is now at the top. At this point the procedure described in the initial part is repeated to transfer the liquid from the glass vial back to the plastic squeeze container of the device. It is important to note how the embodiment allows to transfer a liquid from one container to another without the aid of syringes with needle and in total isolation from the external environment, thus preserving the microbiological quality of the liquid itself. To further reduce the risk of contamination, the device's dispenser could be one of those commercially available designed to dispense multiple doses of a preservative-free sterile liquid (e.g. eye drops, as in the patent WO2014048668A1), and the vial adapter to be connected to the device valve one of those equipped with a sterilizing filter, also available on the market. An example of the embodiment is described in the following: (A) the three elements ready to be combined, i.e.: the device, constituted of plastic squeeze container equipped with a dispenser and a bi-directional luer-activated valve, the vial adapter and the glass vial containing the liquid to be transferred. The container is made of a plastic with squeezable sidewalls, like most of the dispensers for sprays or drops on the market. The moving element of the luer-activated valve at rest keeps the container totally isolated from the external environment. The vial adapter has on its top both the male luer connector which will open the device valve and the luer-lock which will lock it to the valve, and it has at its base the needle which will pierce the rubber stopper of the vial. (B) The same three elements connected to each other. In this configuration, one can see in the open valve of the device its deformed moving element and the needle of the adapter that has pierced the rubber stopper of the glass vial. By pressing and releasing the walls of the plastic squeeze container, the air contained in the container is pushed into the glass vial, thus forcing the liquid to fall by gravity into the plastic container below through the needle of the adapter and the open valve. (C) the unit consisting of the vial adapter connected to the glass vial as separated from the device, which now contains the liquid that was initially contained in the glass vial. The valve is now in the rest position and keeps the plastic container sealed. The device can then be used normally as a common squeeze multi-dose container by removing the cap from the dispenser to release the liquid in the form of a spray or drops. (C') how the device also allows the transfer of a diluent from the plastic container to the glass vial, e.g. to reconstitute or dilute its content before transferring the resulting liquid back to the container. This operation always takes place by pressing and releasing the walls of the container, which is, in this case, in a position higher than the vial, and which will force the diluent to fall by gravity into the vial itself. By turning the system upside down at the end of the process, ones return to the configuration (B). (D) a variant of the invention, in which the device equipped with a spacer, and the vial adapter are pre-assembled in a single block. The spacer element holds the device connected to the vial adapter through the locking tabs of the modified luer without opening the valve, which is therefore in its rest position. (E) the different embodiment described in (D), in which the unit already connected with the vial adapter is connected to the glass vial. The pressure exerted to connect the elements induces also the valve to open and allows the passage of the liquid as described above. The tab locks the system in the new configuration and keeps the valve open. (F) similarly to (C), the unit consisting of the modified adapter connected to both the glass vial and the element, separated from the device which now contains the liquid and can be used normally. In a first combination a device for the preparation and administration of liquids is provided consisting of a squeeze multi-dose container, equipped at one end with a dispenser and at the other end with a bidirectional luer-activated sealing valve which opens only when connected to a vial adapter, such that, by pressing and releasing the resilient walls of the squeeze container, three distinct operations can be performed:—push a liquid from the container to a glass vial connected to the adapter, in case one would intend to reconstitute or dilute its content, —aspirate the liquid from the vial connected to the adapter, and, once the adapter has been disconnected from the valve, —release multiple doses of the liquid through the dispenser.

In a $2^{nd}$ combination according to the previous combination, the fixed part of the valve is composed of polycarbonate, polypropylene or other plastic material, and the moving part of the valve is constituted by a single element of an elastic deformable polymer, e.g. rubber of silicon, or by the combination of a rubber or silicon element and a metal or plastic spring.

In a $3^{rd}$ combination according to any one of the previous combinations, the squeeze container is composed of polypropylene, polyethylene, polyvinyl chloride or other flexible plastic material, or a combination of resilient plastic materials.

In a 4$^{th}$ combination according to any one of the previous combinations, the squeeze container is a tube, to which the valve is heat-sealed or glued.

In a 5$^{th}$ combination according to any one of the previous combinations, the dispenser releases medicines or other liquids in the form of spray or drops.

In a 6$^{th}$ combination according to any one of the previous combinations, the dispenser is of the type that allow to dispense multiple doses of a preservative-free sterile liquid, e.g. equipped with a filter that prevents the entry of contaminated air from the outside, a membrane that self-seals at each dispensing, and/or an element that sterilizes by contact the liquid to be dispensed.

In a 7$^{th}$ combination according to any one of the previous combinations, the vial adapter described in combination 1 has a hollow pointed element aimed to penetrate the rubber stopper of a glass vial and, on the opposite side, a male luer connector and a luer-lock, compatible with the valve of the device.

In an 8$^{th}$ combination according to any one of the previous combinations, the vial adapter described in combination 7 includes a sterilizing filter that prevents the entry of contaminated liquid or air into the container.

In a 9$^{th}$ combination according to any one of the previous combinations, the device is pre-assembled to the vial adapter, so that the user can connect the entire so built unit to the glass vial through a single operation.

In a 10$^{th}$ combination according to any one of the previous combinations, a plastic spacer prevents the pre-assembly of the device with the vial adapter from opening the valve of the device, which therefore remains closed until the time of connection of the adapter to the glass vial.

DRAWINGS

Some embodiments and some aspects of the invention will be described below with reference to the attached drawings, provided for illustrative purposes only, wherein.

Figure 12:
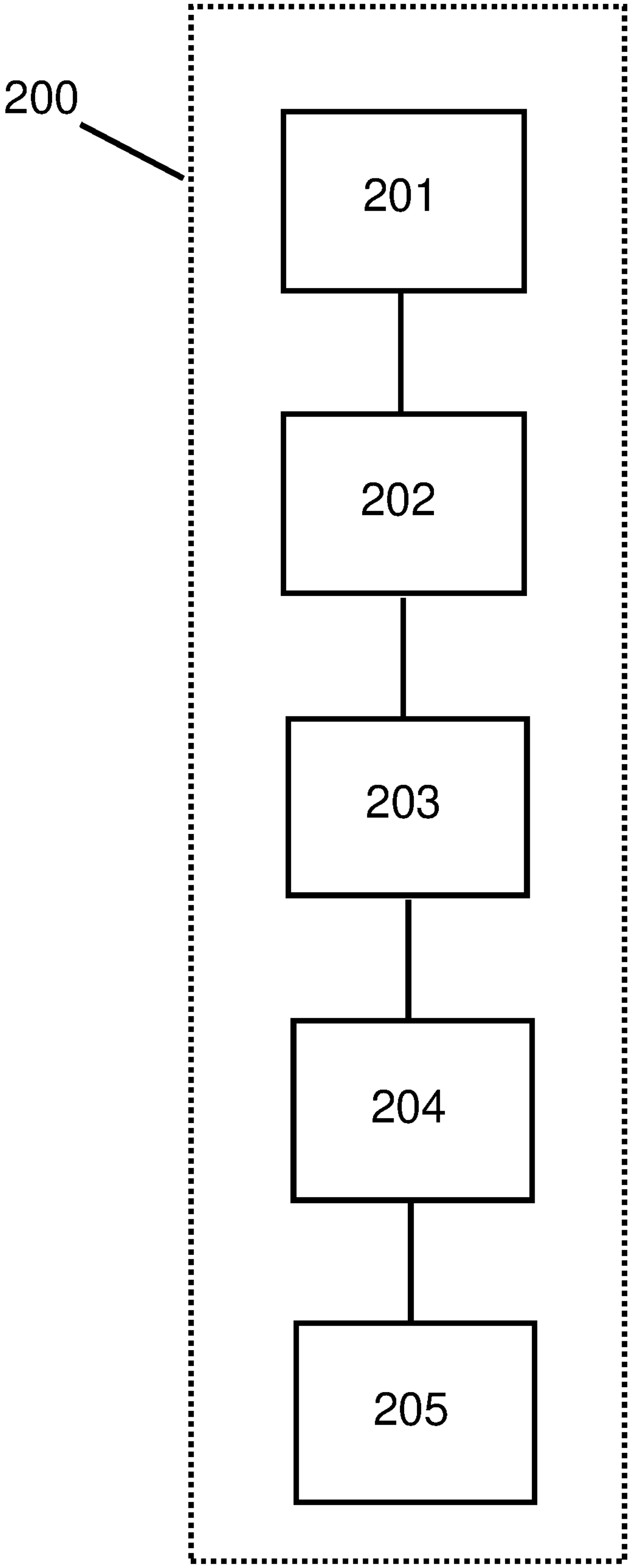

FIGS. 10*a*-10*f* depict the main steps for obtaining the fluid substance in the deformable container according to an embodiment wherein the container is initially empty;

FIGS. 11*a*-11*m* depict the main steps for obtaining the fluid substance in the deformable container according to an embodiment wherein the container initially houses a liquid;

FIG. 12 is a flow chart comprising the main steps of the method for obtaining the fluid substance in the deformable container; and FIGS. 13*a*-13*f* depict the main steps for obtaining the fluid substance in the deformable container according to another embodiment wherein the deformable container contains a liquid for reconstituting or diluting and the vial contains respectively a powder or a liquid concentrate;

DEFINITIONS

In this detailed description, corresponding parts illustrated in the various figures are indicated with the same numerical references. The figures may illustrate the invention by means of non-scale representations; therefore, parts and components illustrated in the figures relating to the object of the invention may relate exclusively to schematic representations.

DETAILED DESCRIPTION

The following disclosure is directed to a deformable container 1 and to a kit 50 including the deformable container 1 and a connecting accessory 51. The following description also discloses an assembly 100 comprising the deformable container 1, the connecting accessory 51 and a vial 101. In addition, the description further discloses a method 200 for fluidly connecting the deformable container 1 to the vial 101 through the connecting accessory 51. The deformable container 1, the kit 50 and the assembly 100 belong to medical field for drug administration. In particular the deformable container 1, the kit 50 and the assembly 100 may be on sale in pharmacy for domestic use. Notably, the deformable container 1, the kit 50 and the assembly 100 may be used by the patient him/herself: thus the invention does not necessarily need to be used by a skilled person in the medical field. The deformable container 1, the kit 50 and the assembly 100 may be directed for dispensing a medical substance 4, in liquid form, at user need.

According to an embodiment, the substance may be a product for ocular use, wherein the deformable container 1 may be configured to house the solution and to dispense it at discrete amounts at time intervals at user's need (i.e., multi-dose delivery): in particular, the product for ocular use contained in the deformable container 1 may be dispensed in the form of drops. The fluid substance 4 may be used as treatment of moderate (persistent epithelial defect) or severe (corneal ulcer) neurotrophic keratitis. The fluid substance may comprise, or consist in, a Cenegermin solution. Cenegermin solution is a sterile, preservative-free medicine used to treat neurotrophic keratitis, an eye condition in which damage to the trigeminal nerve that supplies the surface of the eye causes loss of sensation and lesions that do not heal naturally.

According to a further embodiment, the deformable container 1 may be configured to dispense the medical substance as a spray.

Details related to the structure of the deformable container 1, the kit 50 and the assembly 100 are provided here after in description.

Deformable Container 1

Reference number 1 is directed to a deformable container as shown in FIGS. 1-11.

The deformable container 1 comprises a body 2 defining an internal volume 3 configured to receive a fluid substance 4. The body 2 may comprise a first end portion 5, a second end portion 6, and a lateral wall 7 longitudinally interposed between the first end portion 5 and the second end portion 6. The first end portion 5 and the second end portion 6 may be opposite each other with respect to the lateral wall 7. The lateral wall 7 of the body 2 extends in length along a longitudinal axis X substantially parallel to the lateral wall 7. The longitudinal axis X may be orthogonal to the first end portion 5 and the second end portion 6. The body 2 extends in width along a transversal axis Y orthogonal to the longitudinal axis X. In particular the lateral wall 7 may define the maximum width of the body 2. The first end portion 5 and the second end portion 6 may extend substantially along the transversal axis Y.

The body 2 may have substantially cylindrical shape: in particular in this embodiment the first end portion 5 and the second end portion 6 may have circular shape and the lateral wall 7 has cylindrical shape, defining the diameter of the body 2 of the deformable container 1. According to an alternative embodiment, the body may have elliptical or polygonal shape: in particular a section along a plane orthogonal to the longitudinal axis may define a lateral wall 7 having elliptical or polygonal shape, i.e. square, rectangular, triangular, or hexagonal shape. The body 2 may have an oblong shape, wherein the length along the longitudinal axis is greater than the respective width along the transversal axis. In particular the length may be at least 1.5 times than the width, in particular wherein the length may be at least 2 times said width: optionally the length may be at least 3 or 5 times than the width. In an embodiment, the length of the body 2 may be between 1.5 and 5 times the width of the body, in particular between 2 and 4 times.

The body 2 of the container may extends in length between 20 mm and 90 mm, in particular between 30 mm and 60 mm. The body 2 of the container may extends in width or in diameter between 5 mm and 30 mm, in particular between 10 mm and 25 mm. The at least one elastically deformable wall, i.e. the lateral wall 7 of the body 2, may have a thickness comprised between 0.5 mm and 0.9 mm.

The internal volume 3 of the body 2 is generally larger than 3 ml; it may be in the range between 3 ml and 15 ml, more in particular between 4 ml and 12 ml, in particular at a rest condition when not squeezed.

Notably, the body 2 comprises at least one elastically deformable wall delimiting the internal volume 3. In particular, the deformable wall may comprise the lateral wall 7 of the body 2. Furthermore, the deformable wall may also comprise, in addition or as alternative to the lateral wall 7, the first end portion 5 and/or the second end portion 6 of the body. The body may be made in one piece of plastic or silicone material, or a combination thereof. In particular at least the lateral wall 7 and the second end portion 6 may be made as a single piece. More in particular, the body may be made as a single piece, in particular seamlessly. In this regard, different plastic materials may be used including, but not limited to, polyethylene, polypropylene, polyvinylchloride, or other flexible material or combination thereof. In a preferred embodiment, polyethylene is used, namely LDPE. The body 2 may be made by injection molding or blow molding.

The expression "elastically deformable", referred to the at least one deformable wall of the body 2, indicates that the deformable wall may be repetitively squeezed by a user and then substantially returns to its original shape, for example to its original cylindrical shape. In other terms the body 2 of the deformable container is configured to restore an original shape after being squeezed: the original shape may be the cylindrical shape. Indeed, the body 2 of the deformable container has an original shape at rest, which defines a predefined size of the internal volume, in particular when the container is free of external loads, for example when the container is not squeezed by a user.

Notably, the internal volume 3 of the container 1 is substantially independent on the presence or absence of fluid substance: indeed, the presence of a fluid inside the container does not expand the container itself, neither the absence of a fluid causes a collapse of the body. The body 2 of the deformable container may assume a squeezed shape, which defines a reduced size of the internal volume, when the body is squeezed by a user. Notably the reduced size of the internal volume is smaller than the predefined size of the internal volume. De facto when the deformable container 1 is squeezed by a user, the original shape changes, and the internal volume reduces in size.

The materials mentioned above for making the body 2, namely plastic or silicone or other material having similar mechanical and elastic properties, allow the body to provide this elastic and deformable behavior.

The body 2 includes a filling access 8 configured to receive a fluid substance 4 for filling the internal volume 3 of the body 2. The filling access 8 defines an aperture in the body 2 to allow fluid communication with the internal volume 3, so that a fluid may exit from the internal volume 3 through the filling access 8, and/or the fluid substance may enter into the internal volume 3 through the filling access 8 for subsequent dispensing at user need. More details about the filling procedure of the deformable container are provided later in the next sections of the description. The filling access 8 may has a minimum size, i.e. a diameter, comprised between 3.5 mm and 5 mm.

As shown in the attached figures, the filling access 8 may be carried by the first end portion 5 of the body 2. The filling access 8 may protrude, in particular starting from the first end portion 5, away from the internal volume 3 defining a collar 9. The collar may extend away from the first end portion 5 by a height comprised between 2 mm and 5 mm. The collar may have a cylindrical shape. A lumen defined internally by the collar may have a sized comprised between 3.5 mm and 5 mm.

The collar 9 may further comprise attaching elements **9*a* for connection to a connecting accessory 51: the attaching elements may comprise one between a thread, a bayonet coupling, and a snap-on coupling. An embodiment shown in figures comprises the collar 9 of the filling access 8 having an external thread for connection to a connecting accessory 51. Notably, the collar 9 and the body 2 of the container 1 may be two distinct pieces assembled together. Alternatively, the collar 9 and the body 2 of the container 1 may be made as a single piece, in particular seamlessly. The filling access 8 may comprise a Luer connector for connection to the connecting accessory 51. In particular the Luer connector of the filling access 8** may be a female Luer connector as depicted in the embodiment of the attached figures.

The deformable container 1 further comprises a valve 20 arranged at the filling access 8 and movable between an open configuration, wherein the valve 20 allows fluid passage through the filling access 8, and a closed configuration wherein the valve 20 prevents fluid passage through said filling access 8. In particular the valve 20, when arranged in the open position, allows both a fluid to flow out from the container 1 through the filling access 8, and also a fluid to flow into the internal volume 3 of the container 1 through the filling access 8. In other terms, the valve 20, when arranged in the open position, allows fluid passage in both in and out directions. On the contrary the valve, when arranged in the closed position, prevents fluid passage in both in and out directions. Notably, the passage between the closed position and the open position or vice versa does not depend upon a pressure inside the internal volume 3 of the body 2: the valve 20 is not openable by exerting an internal pressure. As shown in the attached figures, the valve 20 may be arranged inside the collar 9 of the filling access, so that the collar 9 externally surrounds, in particular entirely, the valve 20. Thus, the valve 20 may be entirely surrounded externally by the collar 9, which defines a lateral protection for the valve.

The valve 20 may be a self-sealing valve configured to keep the closed position in a rest condition: thus, the valve, when "untouched", is in the closed portion, preventing a fluid passage through the filling access 8 and, in fact, sealing the container. The valve 20 is configured to move from the closed position to the open condition when a connecting accessory 51 couples to the filling access 8 of the deformable container. In particular a connection between the filling access 8 and the connecting accessory 51 determines a switch of the valve from the closed position to the open position. On the contrary, a disconnection between the filling access 8 and the connecting accessory 51 determines a switch of the valve 20 from the open position to the closed position.

The valve may comprise an outer body housing an elastically deformable member 21 which determines the passage between the closed and the open position: in particular a deformation of the deformable member 21, caused by connection of the connecting accessory 51 to the filling access 8 of the container 1, determines the passage between the closed and the open position and vice versa. The deformable member 21 may be made of an elastically deformable material, e.g., silicone or rubber. The outer body may be made of rigid plastic such as polycarbonate. Both the deformable member and the outer body may be manufactured by respective injection molding. The deformable member 21 of the valve 20 may comprise a slit 22, which is configured to open fluid passage upon coupling of the filling access 8 to a connecting accessory 51, and to close fluid passage when the filling access 8 is disconnected. In particular the deformable member 21 of the valve 20 is configured to deform when the filling access 8 is coupled to the connecting accessory 51, so that this deformation causes the slit 22 to open. Further details about the structure of the connecting accessory 51, which allows activating the open position of the valve 20, are provided in the next section related to the kit 50.

The body 2 of the container further comprises a dispensing outlet 10 configured to dispense out, from the internal volume 3, an amount of the fluid substance 4. The dispensing outlet 10 may be arranged at the second end portion 6 of the body 2: in particular the second end portion 6 of the body 2 may carry the dispensing outlet 10, so that the lateral wall 7 is longitudinally interposed between the first end portion 5 and the second end portion 6. Optionally, the filling access 8 and the dispensing outlet 10 may be opposite each other with respect to the lateral wall 7 of the body 2 of the container 1: in particular the filling access 8 and the dispensing outlet 10 may be aligned along a common axis parallel to the longitudinal axis X of the body 2, or aligned along the longitudinal axis X of the body 2.

As mentioned already above at the beginning of the description, the container 1 may be configured to dispense the fluid substance in different ways, for example as drops or as a spray. Independently on the dispensing modes, namely drops or spray, the dispensing outlet 10 is configured to dispense a plurality of discrete amounts in volume of fluid solution 4 at respective discrete user requests: the discrete amounts may be deliverable at discrete time intervals. The term "discrete" indicates that a time interval is interposed between two subsequent deliveries of the fluid substance: the time interval may define the frequency with which the dispensing outlet 10 dispenses the substance drops, or the frequency of the therapy. In more generic terms, the term "discrete" indicates that the dispensing outlet 10 is configured to dispense "more than one" deliveries of the substance. In particular the dispensing outlet 10 prevents dispensing the entire substance contained in the internal volume 3 of the container 1 in one shot: the dispensing outlet 10 is configured to split the deliveries over several, i.e. a plurality, of events.

Indeed, the container 1 of the present invention is configured to house the fluid substance for a storage time period, for example between 1 and 28 days and in general for at least one week or two weeks, during which the dispensing outlet 10 dispenses discrete amounts of the fluid substance at user need, for example once or twice or three or more times a day over the storage time period.

For example, the medical fluid in the container may be in the range between 0.5 ml and 10 ml, usually the medical fluid transferred into the deformable container is from 2 ml to 6 ml.

Thus, the internal volume 3 of the body 2 is larger than the total amount of medical fluid transferred therein and larger than each discrete amount in volume dispensed each time by the dispensing outlet 10: the internal volume (3) is at least 5 times or 10 times or 20 times larger than the volume of transferred fluid, in particular the internal volume (3) is at least 30 times larger than volume of transferred fluid; moreover the internal volume (3) may allow to dispense from 5 to 500 discrete amounts in volume. Each discrete amount in volume of fluid substance dispensed by the dispensing outlet 10 is comprised between 0.020 ml and 0.2 ml.

The container may comprise a dispensing accessory 11 connected, or configured to be connected, to the dispensing outlet 10: the dispensing accessory 11 may be a component distinct from, and assembled during fabrication to, the body 2. The dispensing accessory 11 may be a dropper or a spray nozzle. The dispensing accessory 11 may be connected to the body 10 of the container 1 through a threaded coupling or a snap-on coupling. According to an embodiment shown in figures, the dispensing accessory 11 is a dropper comprising a housing 12 and an internal membrane 13 arranged inside the housing 12, wherein the membrane 13 acts as a valve for dispensing discrete drops of the fluid substance 4. The membrane 13 is movable between a sealing position and a delivery position. In the sealing position, the membrane 13 prevents fluid communication between the internal volume 3 of the container 1 and the dispensing outlet 10: in particular the fluid substance is prevented from exiting through the dispensing outlet 10 of the container. In the delivery position, the membrane 13 allows fluid communication between the internal volume 3 of the container 1 and the dispensing outlet 10: a discrete amount of fluid substance is thus allowed from exiting through the dispensing outlet 10 of the container.

The housing 12 defines the outer structure of the dispensing accessory 11 and may be made (e.g., by injection molding) of a plastic material such as polypropylene or polyethylene or others. The housing 12 may have the same shape of the body of the container: for example the housing 12 may have cylindrical shape.

The membrane 13 may be made of an elastic material, for example silicone or rubber. The membrane 13 may be movable between the sealing position and the delivery position along a dispenser axis, which may be parallel or coincident to the longitudinal axis X of the body 2 of the container 1. The dispensing accessory 11 may further comprise an elastic member 14 biasing against the membrane 13 to maintain the sealing position: the elastic member 14 may be a metal spring. The elastic member 14 is configured to allow the membrane switching from the sealing position to the delivery position at a predefined pressure within the internal volume of the container 1. The pressure inside the container 1 may be increased by squeezing the body 2, for example a user may use his/her fingers to squeeze the lateral wall 7 of the body 2, so that the inner pressure increases over a threshold which determines the switch from the sealing position to the delivery position. Alternatively the elastic member 14 may be part of the membrane 13, thus the elastic member 14 and the membrane 13 may be made in one single piece: in this case the elastic material of the membrane may act as elastic member 14 to keep the sealing position.

According to a further embodiment, the dispensing outlet 10 is a dropper made in one single piece with the body (embodiment not shown in the attached figures).

The container may further comprise a cap 15 arrangeable at the dispensing outlet 10 and movable between a covered position and an uncovered position and vice versa. In the covered position, the cap 15 covers the dispensing outlet 10 to protect the latter and to keep the dispensing outlet 10 sterile. In particular the cap 15, when arranged in the covered position, may be connected to the dispensing outlet 10 or to the dispensing accessory 11 in a fluid tight manner. When the cap 15 is in the uncovered position, the dispensing outlet 10 is uncovered, in order to allow the fluid substance delivery.

Notably, the internal volume 3 of the container 1 may be originally empty of any substance, i.e. the container 1 may be empty when on sale. Alternatively, the internal volume 3 of the container 1 may be originally filled with a medical liquid, i.e. a saline solution or sterile water. The amount of medical liquid housed in the container 1 may be lower than the maximum size of the internal volume: for example the container may be filled at 1/10, 1/3, 1/2 or 2/3 of the maximum size of the internal volume 3.

Kit 50

The present disclosure is further directed to a kit 50. The kit comprises the deformable container 1 as described in the preceding section of description and according to the aspects and attached claims. The Kit 50 further comprises a connecting accessory 51, shown in FIGS. 1-11, connected or configured to be connected to the filling access 8 of the container 1. The connecting accessory 51 comprises a first coupling portion 52 configured to fluidly connect to the filling access 8 of the deformable container 1. For the connection, the first coupling portion 52 of the connecting accessory 51 may comprise a threaded coupling portion for connection to a threaded coupling portion (attaching elements 9*a*) of the filling access 8 of the container. Alternatively, the filling access 8 of the container 1 and the first coupling portion 52 of the connecting accessory 51 comprise snap on couplings to allow mutual coupling thereof.

According to an embodiment shown in FIGS. 1-11, the first coupling portion 52 of the connecting accessory 51 comprise a Luer connector for connection to the Luer connector of the filling access 8 of the container 1. In particular the Luer connector of the first coupling portion 52 of the connecting accessory 51 may be a male Luer connector, while the Luer connector of the filling access 8 of the container 1 may be a female Luer connector. The male Luer connector of the first coupling portion 52 of the connecting accessory 51 comprises a protrusion 54 that abuts, when in a coupled configuration, against the valve 20 of the filling access 8 of the container 1, causing the valve 20 to move to the open position. The coupled configuration is defined when the first coupling portion 52 of the connecting accessory 51 is coupled to the filling access 8 of the container 1. In particular the protrusion 54 abuts, when in the coupled configuration, against the deformable member 21 of the valve 20 of the filling access 8 of the container 1. The protrusion 54, when in the coupled configuration, may penetrate into (or in any case deform) the slit 22 of the deformable member 21 of the valve 20, thereby opening the slit thereby defining an open fluid passage.

Thus, when the first coupling portion 52 of the connecting accessory 51 is coupled to the filling access 8 of the container 1, the protrusion 54 of the connecting accessory may be arranged inside the collar 9 of the filling access 8 of the container 1: in particular the collar 9 of the container 1 may entirely surround the protrusion 54 of the connecting accessory when the first coupling portion 52 of the connecting accessory 51 is coupled to the filling access 8 of the container 1. Optionally, the deformable member 21 of the valve 20 may be squeezed, in particular interposed, between the collar 9 and the protrusion 54 when the first coupling portion 52 of the connecting accessory 51 is coupled to the filling access 8 of the container 1. Notably, the valve of the container 1 is in the open configuration when the kit 50 is in the coupled configuration: thus, fluid communication is allowed between the internal volume of the container 1 and the first coupling portion 52 of the connecting accessory only when the kit 50 is in the coupled configuration.

The connecting accessory 51 further comprises a second coupling portion 60 configured to fluidly connect to an internal compartment 102 of a vial 101, which is described in more details in the next section related to the assembly 100. The second coupling portion 60 is in fluid communication with the first coupling portion 52 through an internal passage 70 of the connecting accessory 51. The internal passage 70 is interposed between the first coupling portion 52 and the second coupling portion 60. In particular, the first coupling portion 52 and the second coupling portion 60 may be aligned along a common connecting axis Z: optionally the first coupling portion 52, the second coupling portion 60 and the internal passage 70 may be aligned along the same connecting axis Z.

The connecting axis Z is a straight line.

Thus, the first coupling portion 52, the second coupling portion 60 and the internal passage 70 of the connecting accessory 51 define in combination a fluid passage to allow fluid communication between the inner volume of the vial 101 and the inner volume of the container 1.

In an embodiment, a sterilizing filter may be placed along the internal passage to filter any liquid passing there-through. The sterilizing filter further reduces the risk of contamination during the transfer.

The first coupling portion 52 may further comprise a collar 55 externally surrounding, at least partially, the protrusion 54 of the first coupling portion 52. The collar 55 of the first coupling portion 52 may extend in height away from the second coupling portion 60 and along the connecting axis Z. In particular the collar 55 of the first coupling portion 52 may have cylindrical shape extending parallel to the connecting axis Z. The collar 55 of the first coupling portion 52 may have attaching elements 55*a* for connection to the attaching elements 9*a* of the collar 9 of the filling access 8. The attaching elements 55*a* may comprise one between a thread, a bayonet coupling, a snap-on coupling. In particular a thread may be arranged on an internal wall of the collar 55 of the first coupling portion 52: in this case the thread faces the protrusion 54.

According to the embodiment shown in FIGS. 1-3 and 7-11 the collar 55 of the first coupling portion 52 is configured to be directly coupled to the collar 9 of the deformable container 1, when in the coupled configuration.

In particular according to the embodiment shown in FIGS. 1-3 and 7-11, the connecting accessory 51 is in a single piece made of plastic material such as polycarbonate, e.g. made by injection.

Figure 1:
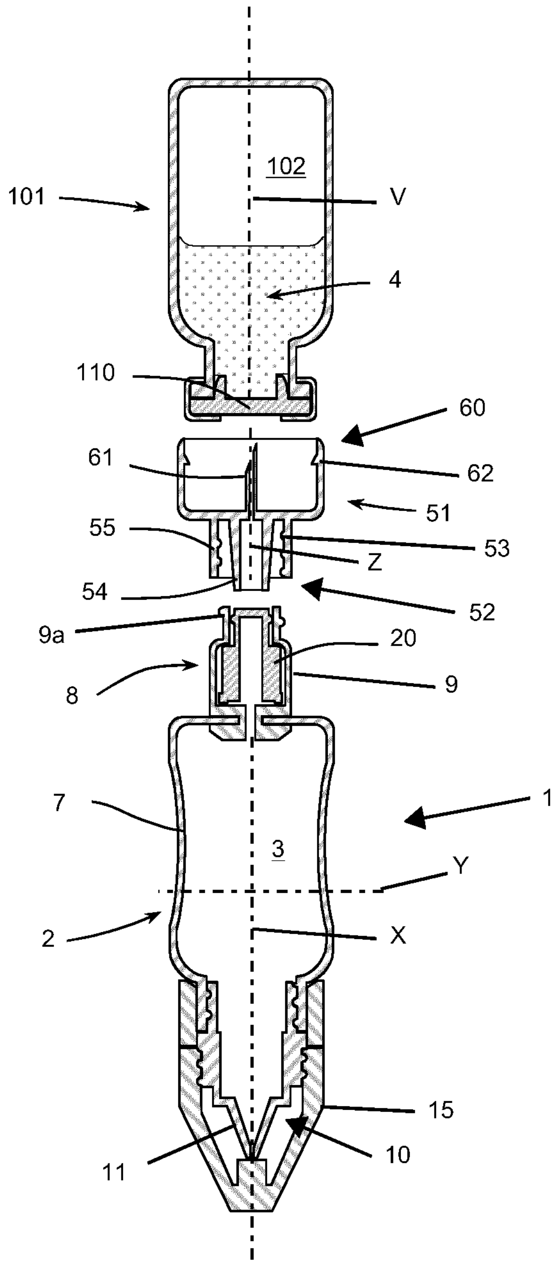
FIG. 1 is section view along a longitudinal axis of the deformable container, the connecting accessory and the vial in a disassembled condition.
Figure 2:
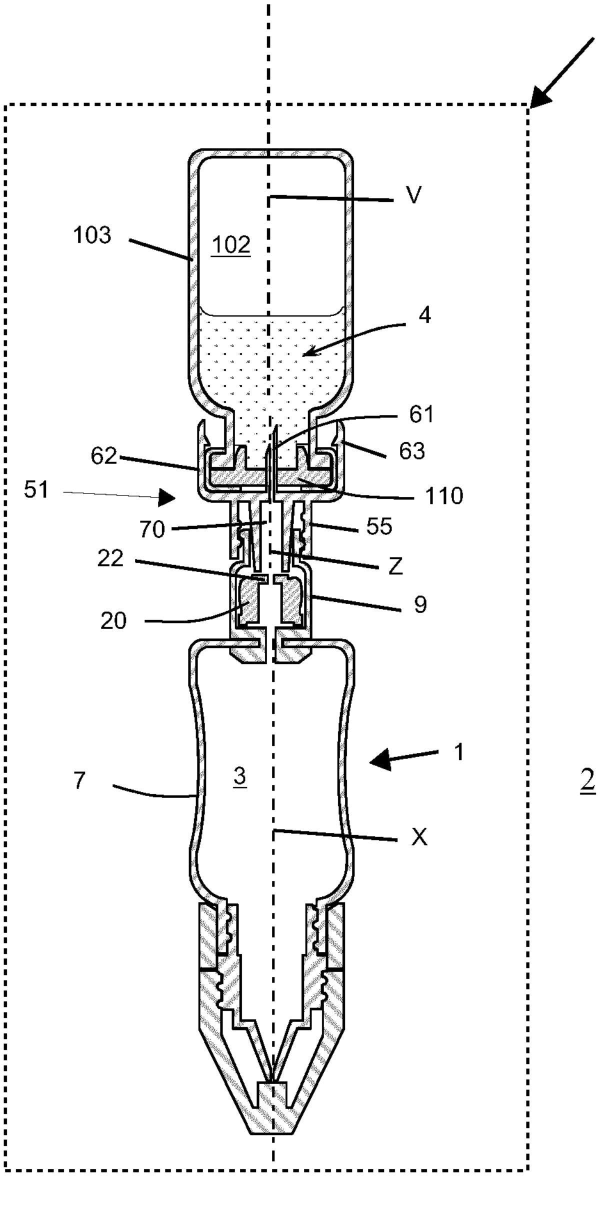
FIG. 2 is section view along a longitudinal axis of the deformable container, the connecting accessory and the vial in an assembled configuration.
Figure 3:
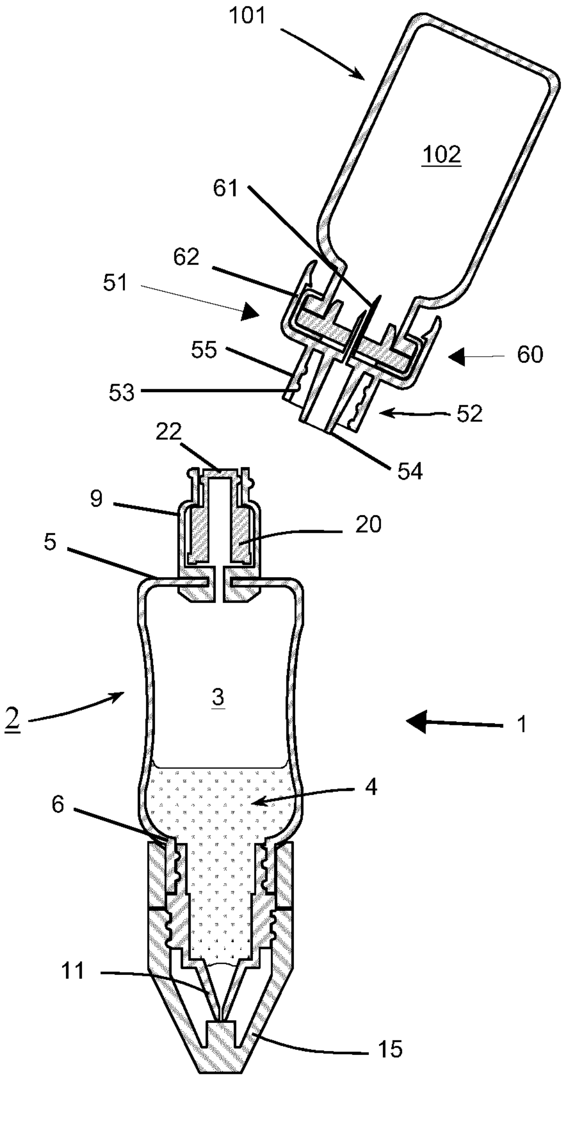
FIG. 3 is section view along a longitudinal axis of the deformable container, the connecting accessory and the vial, subsequent in time with respect to the assembled configuration wherein the container, once the liquid has been transferred from the vial, is separated from the connecting accessory and the empty vial.
Figure 4:
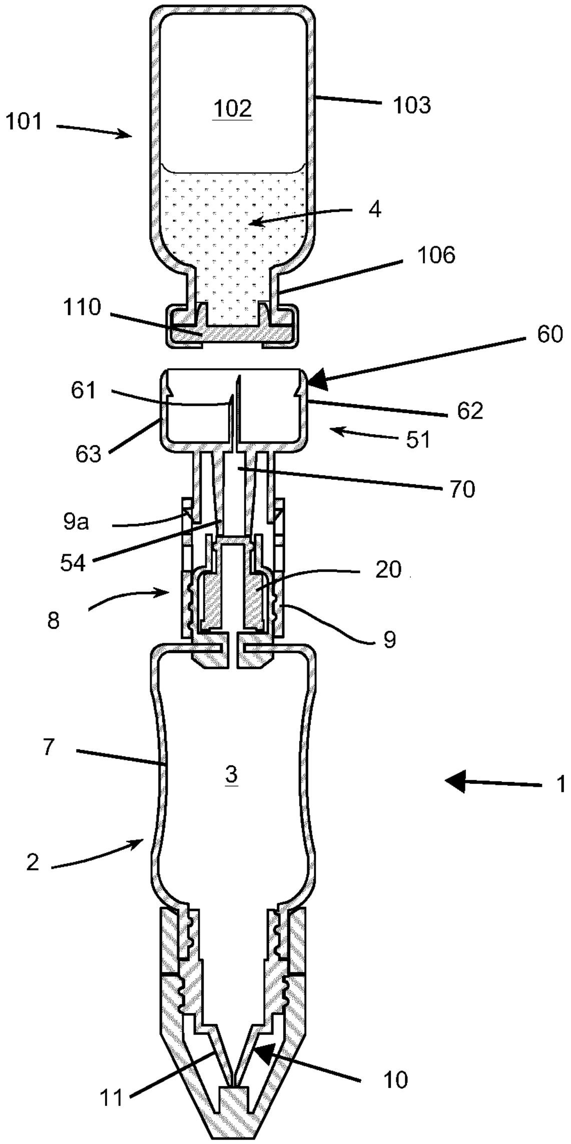
FIG. 4 is section view along a longitudinal axis of a further embodiment of the deformable container, the connecting accessory and the vial in a disassembled condition.
Figure 5:
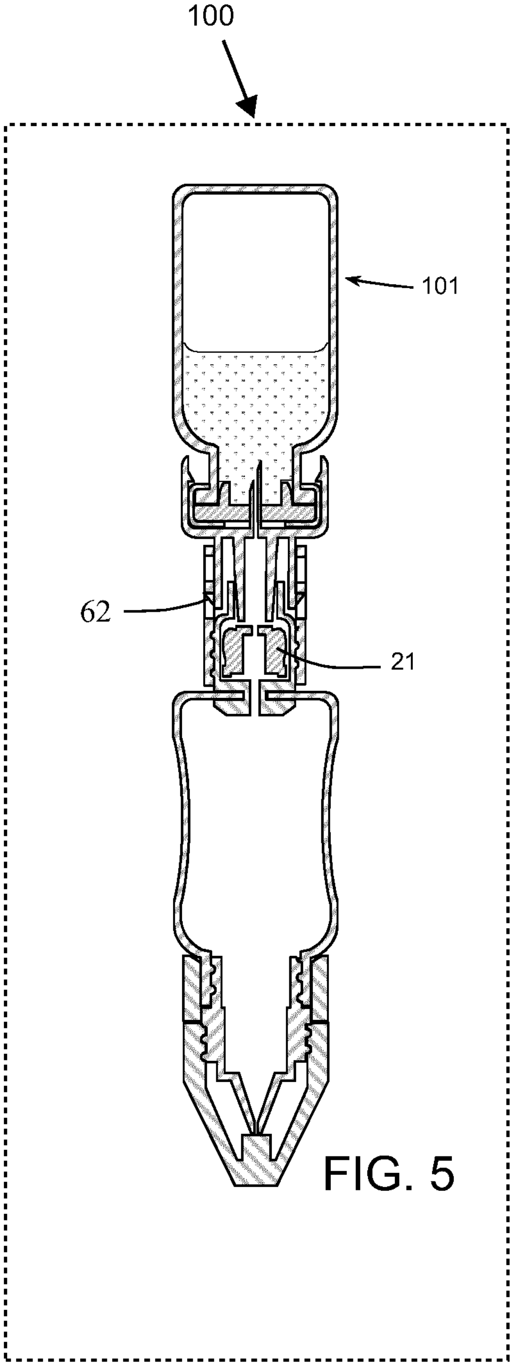
FIG. 5 is section view along a longitudinal axis of the further embodiment of FIG. 4, wherein the deformable container, the connecting accessory and the vial are in an assembled configuration.
Figure 6:
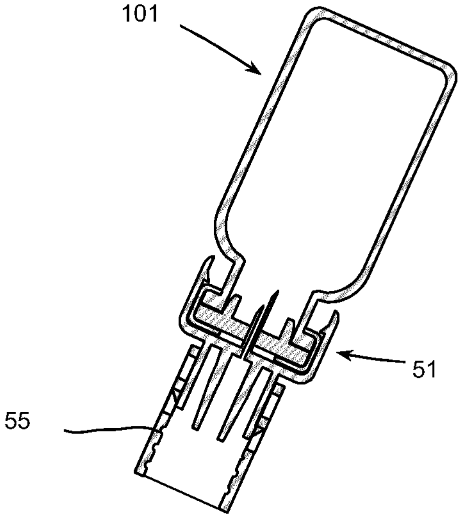
FIG. 6 is section view along a longitudinal axis of the further embodiment of FIG. 4 and subsequent in time with respect to the assembled configuration, wherein the container, once the liquid has been transferred from the vial, is separated from the connecting accessory and the empty vial.
Figure 6:
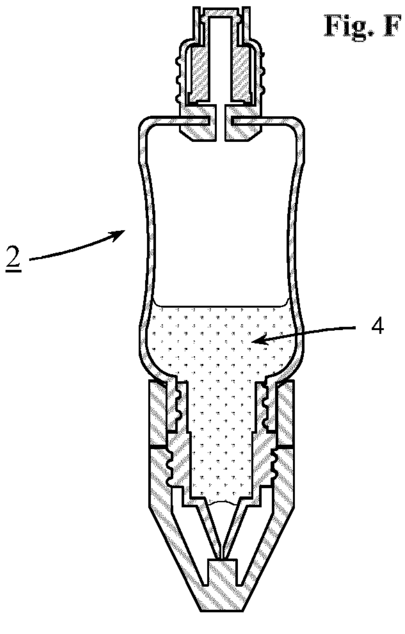
Figure 7:
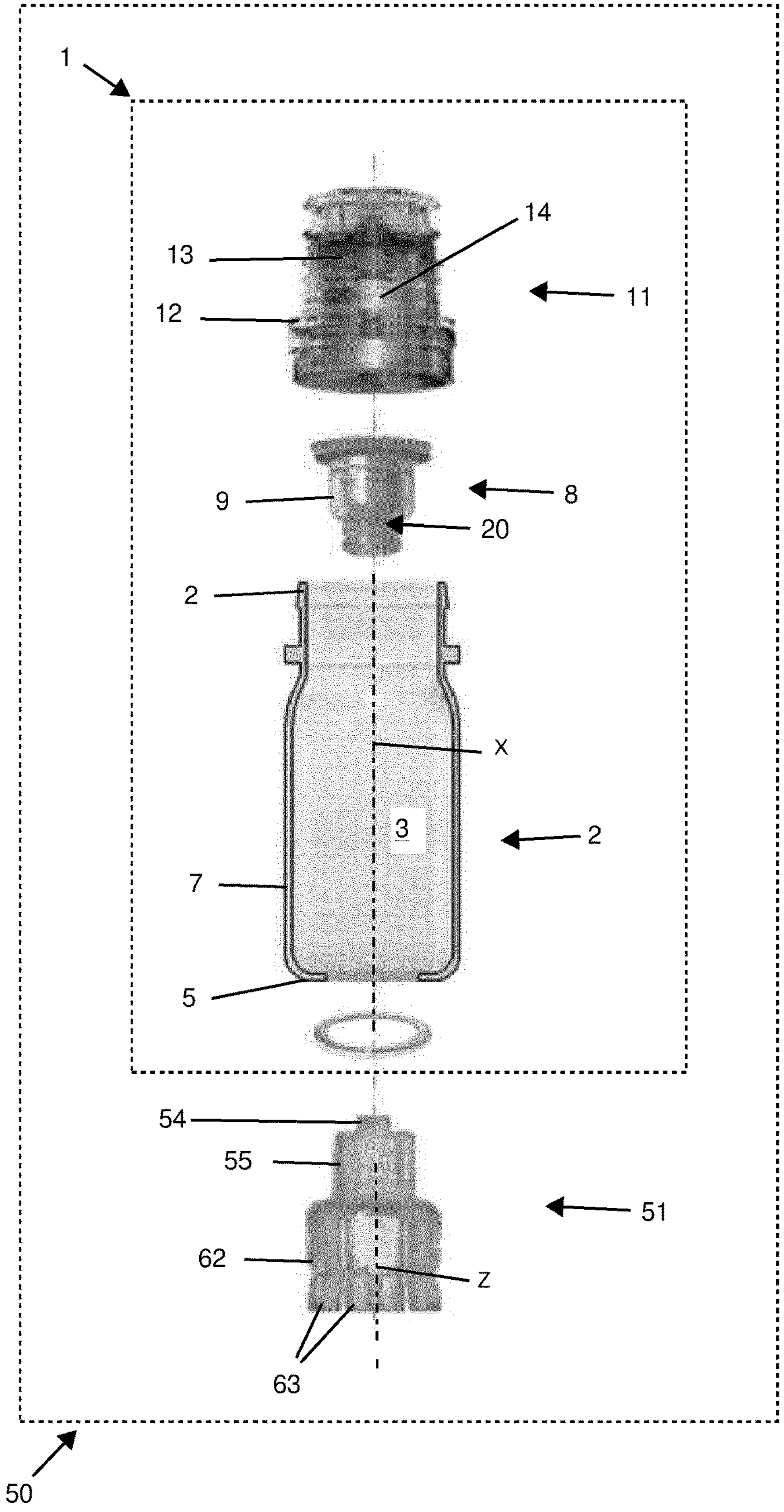
FIG. 7 is a section view of a further embodiment of the deformable container, the connecting accessory and the vial in a disassembled condition.
Figure 8:
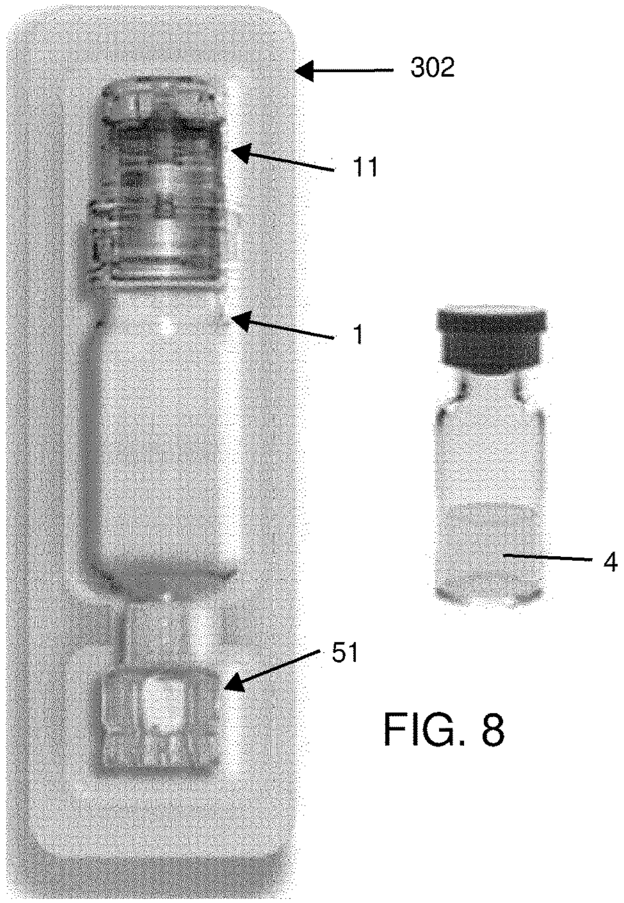
FIG. 8 shows a package containing the deformable container and the connecting accessory in a coupled configuration.
Figure 9:
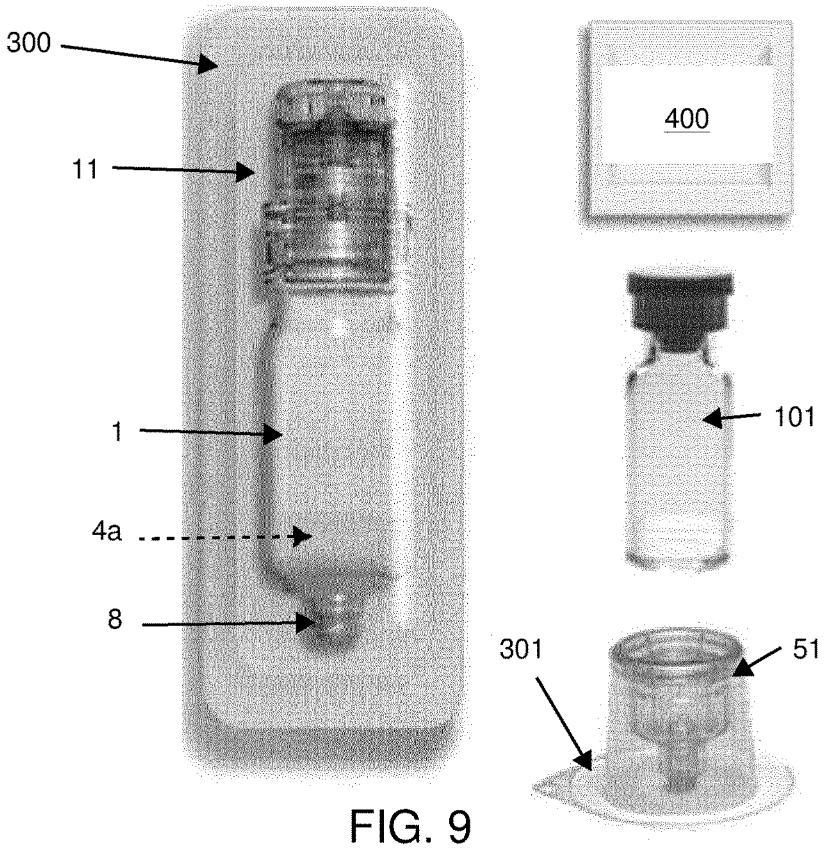
FIG. 9 shows a package containing the deformable container, and a further package containing the connecting accessory.

A further embodiment of the connecting accessory is shown in FIGS. 4-6, wherein the connecting accessory 51 comprises a connector 56 configured to engage the collar 55 of the first coupling portion 52 of the connecting accessory 51 to the collar 9 of the container 1. The connector 56 is a distinct component with respect to the collar 55 of the connecting accessory 51. The connector 56 is connected to the collar 55 of the first coupling portion 52 of the connecting accessory 51 by interlocking coupling or by glue. The connector 56 externally surrounds the collar 55 of the first coupling portion 52 of the connecting accessory 51. Furthermore, the connector 56 is configured to externally surround the collar 9 of the container when in the coupled configuration. In particular the connector 56 has cylindrical shape defining an internal surface configured to constrain to an external surface of the collar 55 of the first coupling portion 52 of the connecting accessory 51 and to an external surface of the collar 9 of the container 1. The second coupling portion 60 of the connecting accessory 51 may comprise a hollow needle 61 for connection to the vial 101: the needle 61 is hollow in order to allow fluid communication with the compartment 102 of the vial 101. Thus, the connecting accessory 51 defines fluid passage through the needle 61, the internal passage 70, and the first and second coupling portions 52, 60. The needle 61 may be aligned along the connecting axis Z. The needle 61 may be one between a G18 to G24 that has a gauge, namely the diameter of the internal lumen, comprised between 0.83 mm and 0.32 mm. Of course, other needles may be used. The needle has a length lower than the height of the collar 62 coupling with the glass vial top so that the needle does not emerge from the vertical overall span of the accessory and the risk of getting stung is reduced. The needle may have a length comprised between 4 mm and 10 mm. The needle 61 may be made of plastic, i.e. made of the same material used for fabricating the first coupling portion 52, the second coupling portion 60 and the internal passage 70. Alternatively, the needle 61 may be made of metal, i.e. stainless steel. The second coupling portion 60 of the connecting accessory 51 may comprise a collar 62 surrounding the needle 61: the collar 62 may be configured to couple to a respective portion of the vial 101 to mechanically constrain the connecting accessory 51 to the vial 101. The collar 62 of the second coupling portion 60 of the connecting accessory 51 may define a snap-on coupling for connection to the vial, as shown in FIGS. 1-11. For example, the collar 62 of the second coupling portion 60 may comprise two or more flexible walls or fingers 63 configured to expand outwardly during coupling of the second coupling portion 60 to the vial 101. In particular the connecting accessory 51 may comprise between three and twelve flexible walls or fingers 63, in particular between four and eight flexible walls or fingers 63. The flexible walls or fingers may be made of plastic. Alternatively, the flexible walls or fingers may be made of metal, rubber, or silicone. According to an embodiment, the connecting accessory 51 is made in a single piece, for example made in plastic.

Assembly 100

The present disclosure is also directed to an assembly 100. The assembly 100 comprises the container 1, the connecting accessory 51 and the vial 101. In other terms, the assembly 100 comprises the kit 50 and the vial 101. The assembly 100 is directed to allow a user (the person applying the product), e.g. a patient or a person dispensing the drug to the patient, to move a substance, housed in the compartment 102 of the vial 101, into the internal volume 3 of the container 1. The vial 101 may contain the fluid substance 4, a medical liquid, or a substance in powder. For example, the vial 101 may contain a product for ocular use in liquid or powder state. The vial 101 comprises a housing 103 defining the internal compartment 102. The housing 103 may be made of glass, which allows maximizing the lifetime of the substance therein. The housing 103 may have cylindrical shape: alternatively, the housing may have polygonal shape.

Glass medicine vials generally have a rubber plug and an aluminium ring blocking the rubber plug. They often also have a plastic flip-off to ensure the cap is kept clean. The compartment 102 of the vial may have a volume comparable or substantially equal to the internal volume 3 of the deformable container 1. Alternatively, the internal volume 3 of the deformable container 1 may be larger in volume than the compartment 102, for example the deformable container 1 may be larger in volume than the compartment 102 by 1.5 times or 5 times. In particular the volume of the compartment 102 of the vial may be comprised between 3 ml and 15 ml, in particular between 4 ml and 12 ml. The housing 103 of the vial 101 may comprise a lateral wall 104, a bottom wall 105, and a top edge 106 opposite to the bottom wall 105. The lateral wall extends in length between the bottom wall and the top edge 106 along a vial axis V. When the vial has cylindrical shape, the vial axis is the cylinder axis. The vial further comprises a diaphragm 110 penetrable by the needle 61 of the connecting accessory 51: the diaphragm 110 may be arranged at the top edge 106 of the housing 103. The diaphragm 110 may be substantially orthogonal to the vial axis. The diaphragm 110 of the vial may be made of an elastic material, i.e. rubber or silicone. The diaphragm 110 is constrained to the top edge 106 of the vial 101 in a fluid tight manner, so that the fluid housed in the vial 101 is preserved: thus, the compartment 102 of the vial 1 is hermetically closed before the needle 61 of the connecting accessory penetrates the diaphragm 110 into the compartment. The assembly 100 is configurable in an assembled configuration, shown in FIGS. 2 and 5, wherein the deformable container 1 and the connecting accessory 51 are in the coupled configuration, and the second coupling portion 60 of the connecting accessory 51 is connected to the vial. In particular the second coupling portion 60 of the connecting accessory 51 may be connected to the vial 101 though the flexible walls or fingers 63. FIGS. 10*d*, 10*e* and 11*g*-11*l* also show the assembly 100 in the assembled configuration.

In the assembled configuration the needle 61 of the connecting accessory 51 passes through diaphragm 110 of the vial 101. Therefore, in the assembled configuration, the internal volume 3 of the deformable container 1 is in fluid communication with the compartment 102 of the vial 101 through the connecting accessory 51. Notably, the assembly 100, when in the assembled configuration, defines a closed volume defined as a combination of the internal volume 3 of the container 1, the compartment 102 of the vial 101, and the internal passage 70 of the connecting accessory 51.

Notably, when in the assembled configuration, the vial 101, the deformable container 1 and the connecting accessory 51 are aligned along a common axis, wherein the connecting accessory 51 is interposed between the vial and the container along this common axis. The common axis may coincide with the longitudinal axis X of the deformable container. In particular, when in the assembled configuration, the vial axis V of the vial 101 may be coincident with the longitudinal axis of the deformable container 1. More in particular, when in the assembled configuration, the vial axis V of the vial 101 may be coincident with the longitudinal axis of the deformable container 1 and with the connecting axis Z of the connecting accessory 51.

Method 200

Figure 10:
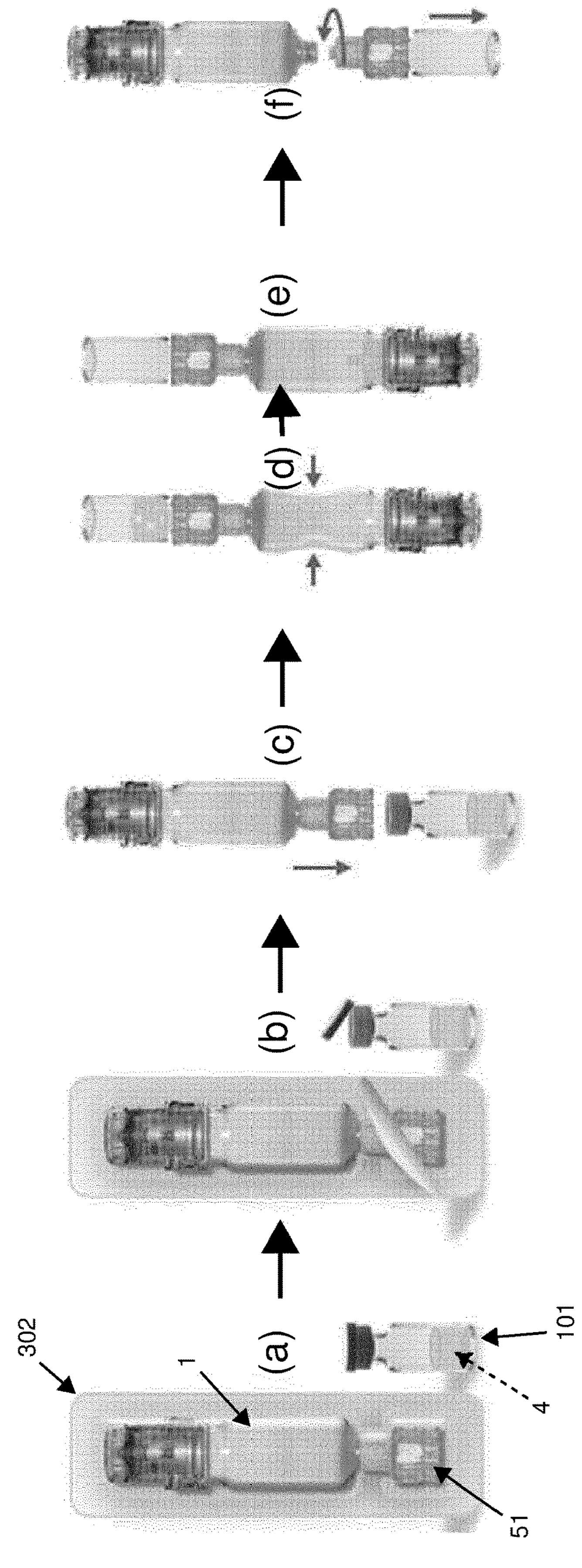
Figure 11:
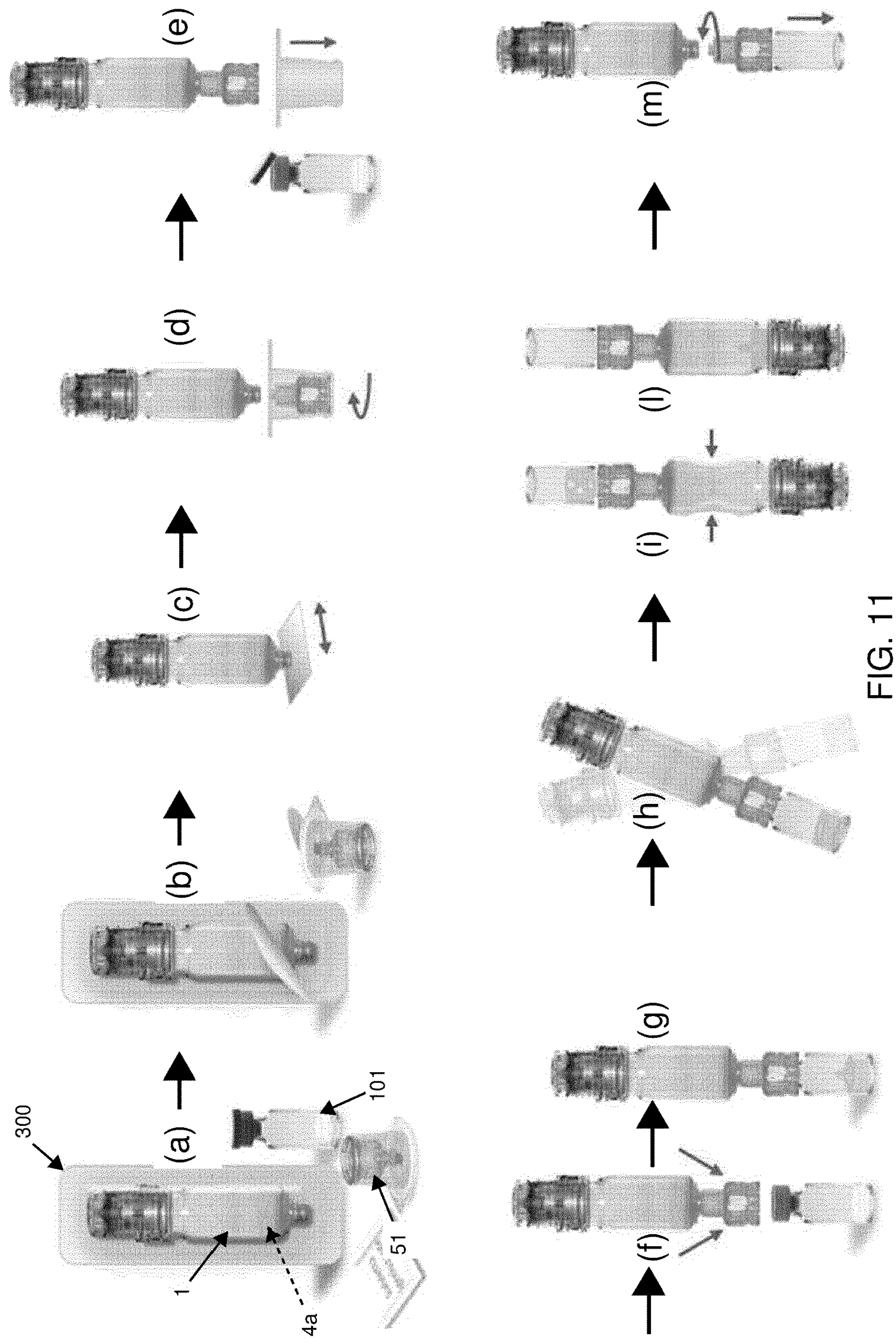

The present disclosure is further directed to a method 200 for moving a medical solution from the vial 101 to the container 1. In particular the method 200 is directed for moving the fluid substance 4 in the deformable container 1 previously described. FIG. 12 shows the multiple steps of method 200 in a flow chart. Furthermore, FIGS. 10, 11 and 13 depict the method steps one after the others.

The method 200 comprises a step 201 (see FIGS. 10*a*, 10*b* and 11*a*, 11*b*) of providing an assembly 100 according to the previous description. In particular the method 200 comprises a step of providing the deformable container 1, the connecting accessory 51, and the vial 101.

At step 201, the container 1 may be initially empty, as shown in FIGS. 1-3, 5, 8 and 10*a*. Alternatively, at step 201, the container 1 may initially contain a medical liquid 4*a*, i.e. a saline solution or sterile water, as shown in FIG. 11*a*. At step 201, the vial 101 contains one between the fluid substance 4, a medical liquid, and a substance in powder. A mixing between the medical liquid 4*a* of the container 1 and the substance in powder of the vial 101 generates the fluid substance 4 for subsequent delivery to the user. Clearly, the vial 101 may alternatively house a liquid concentrate that requires to be diluted by the thinner included in the deformable container as well. The substance in powder form may also be a lyophilised substance.

The step 201 may further comprise a step of removing the deformable container 1 from a package 300 (see FIGS. 10*b* and 11*b*), which is configured to protect the deformable container 1 after fabrication, i.e. during transportation and storage. The step 201 may further comprise a step of removing the connecting accessory 51 from a further package 301 (see FIGS. 10*b* and 11*b*), which is configured to protect the connecting accessory 51 after fabrication, i.e. during transportation and storage. The step 201 may further comprise a step of removing the vial 101 from a package, which is configured to protect the vial 101 after fabrication, i.e. during transportation and storage. Notably, at step 201, the container 1 and the connecting accessory 51 may be provided separately, for example housed in different packages, as in FIG. 9. Alternatively, the container 1 and the connecting accessory 51 may be provided uncoupled but in the same package. In a further alternatively embodiment, at step 201, the container 1 and the connecting accessory 51 may be provided in the coupled configuration in a common package 302, as in FIG. 8.

The method further comprises the step 202 (see FIGS. 10*c* and 11*d*, 11*e*) of connecting the filling access 8 of the deformable container 1 to the first coupling portion 52 of the connecting accessory 51. The step 202 of connecting the filling access 8 of the deformable container 51 to the first coupling portion 52 of the connecting accessory 51 determines the valve 20 of the filling access 8 of the container 1 to move in the open position to allow fluid passage. In particular the step 202 determines a deformation of the deformable member 21 of the valve 20 of the container, causing the valve to move in the open position. The step 202 of connecting the filling access 8 of the deformable container 1 to the first coupling portion 52 of the connecting accessory 51 may comprise screwing by rotation the first coupling portion 8 of the connecting accessory 51 on the filling access 8 of the deformable container 1. Alternatively, the step 202 may comprise pushing the filling access 8 of the deformable container 1 against the first coupling portion 52 of the connecting accessory 51 to perform a snap-on coupling.

The method further comprises a step 203 of connecting the second coupling portion 60 of the connecting accessory 51 to the vial 100 to define the assembled configuration (see FIGS. 10*c*-10*d* and 11*f*-11*g*). The step 203 of connecting the second coupling portion 60 of the connecting accessory 51 to the vial 101 may comprise pushing the second coupling portion 60 of the connecting accessory on a top edge 106 of the vial 101, in order to determine deformation of the flexible wall or fingers 63 outwardly, causing thereby the flexible wall or fingers 63 to constrain to the top edge 106 of the vial 101. Alternatively, the step 203 may comprise screwing by rotation the second coupling portion 60 of the connecting accessory 51 to the vial 101. Notably, the step 203 of connecting the second coupling portion 60 of the connecting accessory 51 to the vial 101 comprises penetrating, by the hollow needle 61, the diaphragm 110 of the vial 101. In particular the penetration of the needle 61 through the diaphragm 110 occurs during the step 203 of connecting the second coupling portion 60 of the connecting accessory 51 to the vial 101. Thus, the step 203 causes the hollow needle 61 to enter in the compartment 102 of the vial 101 to put the compartment 102 of the vial 101 in fluid communication with the internal volume 3 of the container 1. Notably, the steps 202 and 203 causes the compartment 102 of the vial to be in fluid communication with the internal volume 3 of the deformable container 1 through the connecting accessory 51, defining the assembled configuration. On the contrary, prior to the step 202 of connecting the filling access 8 of the deformable container 1 to the first coupling portion 52 of the connecting accessory 51, the valve 20 at the filling access 8 of the container is in the closed position.

The method further includes a step 204 of squeezing, in particular manually squeezing, the deformable container 1 to reduce the internal volume 3 (see FIGS. 10*d* and 11*i*). The step 203 is performed by a user, e.g. the patient: by using the fingers of his/her hands, the user squeezes the container at the lateral wall 7, which deforms causing a reduction of the internal volume 3. If the container 1 is initially empty, the step 204 of manually squeezing the deformable container 1 determines passage of gas or air from the internal volume 3 of the container to the compartment 102 of the vial 101, thereby increasing pressure in the vial. If the vial 101 is on top of the empty compressible container, this pressure will cause the liquid to flow from the vial into the deformable container when the container walls are released. Notably, if the container 1 is initially empty, the vial contains the fluid substance 4, which is in liquid state. Alternatively, if the container 1 initially contains a medical liquid 4*a*, i.e. a saline solution or sterile water as in FIG. 11*a*, the step 204 of manually squeezing the deformable container 1 determines passage of this medical liquid 4*a* from the internal volume 3 of the container 1 to the compartment 102 of the vial 1. The procedure has to be performed with the vial 101 located lower than the compressible container with the liquid. Notably, if the container 1 initially contains a medical liquid 4*a* as in FIG. 11*a*, the step 204 results in mixing the medical liquid 4*a* of the container 1 with the substance, i.e. the liquid or powder substance, of the vial 101: the mixing between the medical liquid 4*a* of the container 1 and the substance of the vial 101 generates the fluid substance 4 in liquid state. If the container 1 initially contains the medical liquid 4*a*, the method 200 may comprise a step of arranging the deformable container 1 above the vial 101, as shown in FIG. 11*h*: the deformable container 1 has to be maintained above the vial 101 during the step 204 of manually squeezing the deformable container 1.

The method further comprises a step 205 of releasing the deformable container 1 to allow elastic return of the body 2 (see FIGS. 10*e* and 11*l*). During step 205, the body 2 returns to its original shape, namely the shape that the body has at step 201. The step 205 of releasing the deformable container 1 causes the internal volume 3 to re-expand after being squeezed. In particular the elastic return of the body 2 causes a sucking step wherein the container 1 sucks the fluid substance 4 from the vial 101 to the internal volume 3 of the container 1.

Notably, the method 200 may comprise a step of arranging the vial 101 above the deformable container 1 during the step 205 of releasing the deformable container 1, as shown in FIGS. 10*e* and 11*l*. The method 200 may also comprise sequentially repeating the steps of squeezing and releasing until the fluid substance 4 is completely moved into the deformable container 1. Lastly, the method comprises disconnecting the vial 101 the connecting accessory 51 from the container 1: the user is now able to dispense the fluid substance 4*a* at time intervals as prescribed by the doctor. The method may further comprise a step of aligning the longitudinal axis X of the deformable container 1 with the vial axis V of the vial 101. In particular the method 200 may comprise a step of aligning the longitudinal axis X of the deformable container 1 with the vial axis V of the vial 101 and with the connecting axis Z of the connecting accessory 51: in this way the longitudinal axis X, the vial axis V and the connecting axis Z are coincident each other or parallel each other. Notably, the steps 201, 202, 203, 204 and 205 may be sequentially performed in this numerical order.

Looking at the specific example of FIG. 13, the method is here referred to a configuration wherein the vial 101 contains a substance 16 that has to be either reconstituted or diluted. In other terms, vial 101 houses either a medicament in powder form or a concentrated solution. Correspondingly, the deformable container contains the liquid solution 4 to reconstitute or dilute substance 16.

Figure 13C:
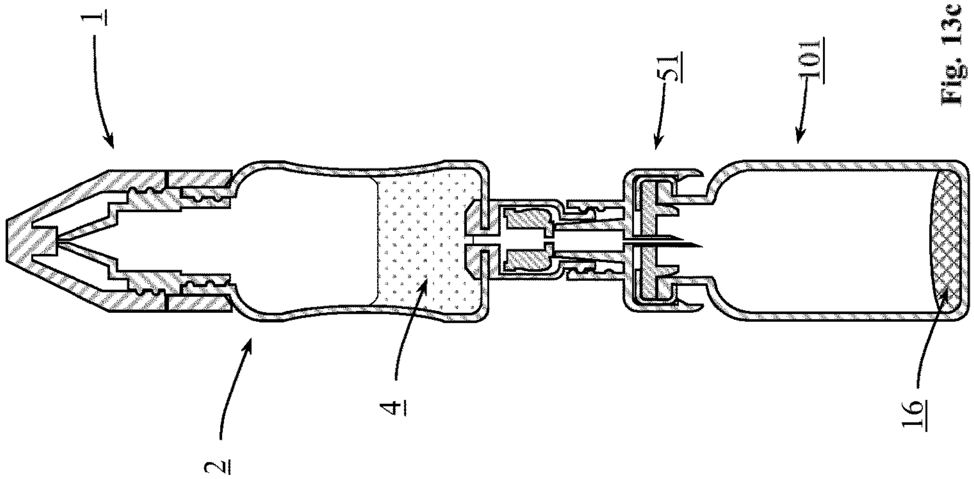
Figure 13B:
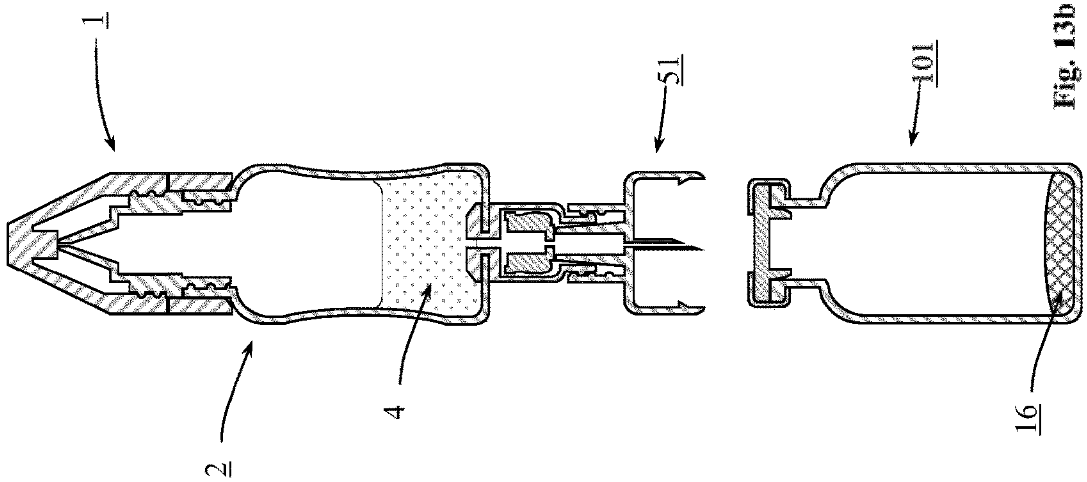
Figure 13A:
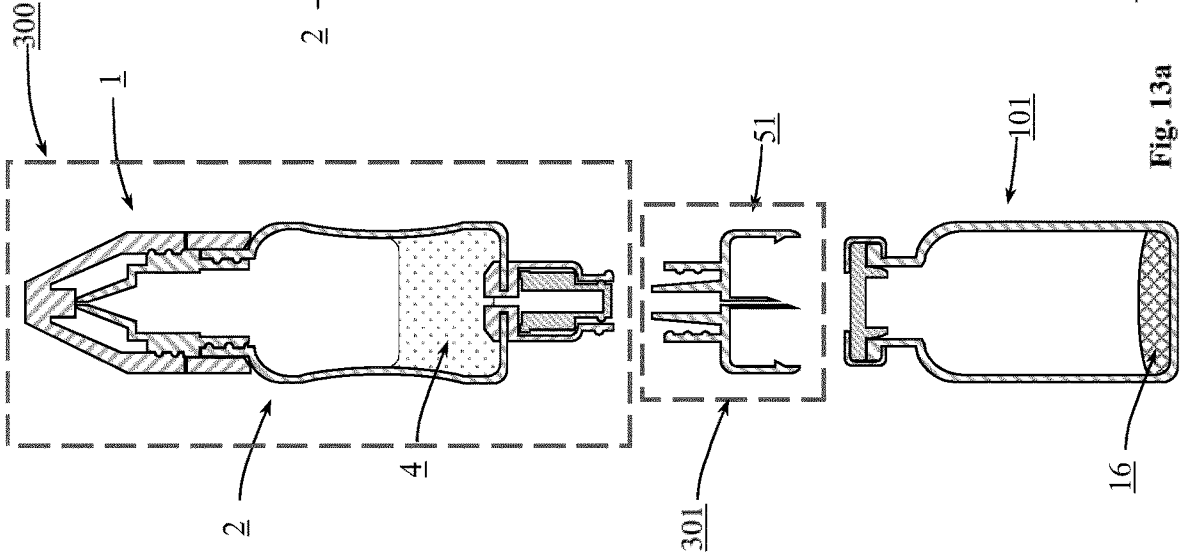

The deformable container 1 is in its package 300 and the connecting accessory 51 is housed in the respective further package 301 (see FIG. 13*a*). The sterile packages are opened and the connecting accessory 51 is coupled to the deformable container 1 so that the valve is moved into the open position (FIG. 13*b*). Then, the kit is further coupled to the vial 101 as indicated in FIG. 13*c* forming the flow passage between the internal volume 3 of the deformable container 51 and the internal compartment 102 of the vial 101. Alternatively, the connecting accessory 51 may be vice versa coupled to the vial 101, first, and then in a second time to the deformable container 1 (not shown in the sequence of FIG. 13).

Figures 13D, 13E, 13F:
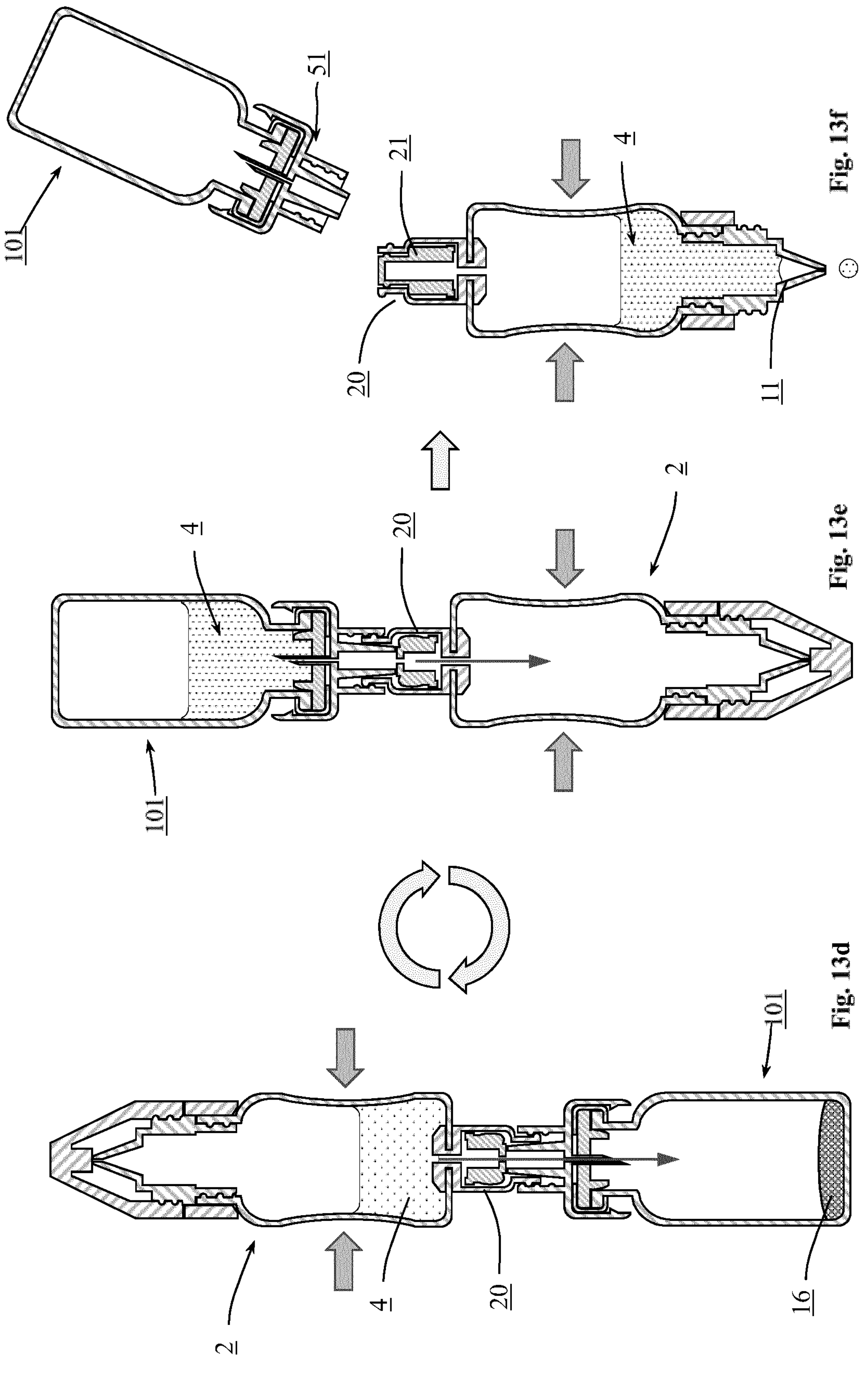

The user presses the lateral walls of the deformable container 2 as indicated in FIG. 13*d*. The liquid 4 is pushed downwards through the passage 70 into the vial 101 to mix with the substance 16 in the vial. Once the two components are duly mixed, the assembly 100 is turned upside down as shown in FIG. 13*e*. The deformable container 1 (that after being pressed as indicated in FIG. 13*d* had returned to its original shape) is pressed and deformed again by the user as indicated. Air passes through the needle into the vial 101 and increases pressure in the internal compartment 102. As soon as pressure is released by the user, the deformable container 1 starts returning elastically to its original shape and the mixed liquid flows downwards into the deformable container 1. Once the whole solution has passed, the vial 101 is removed from the assembly and container 1 is ready for delivering the drug.

The user presses again lateral walls of the deformable container as indicated in FIG. 13*f*. Since valve 20 is now closed, inner pressure causes the dispensing accessory 11 to release the product. For example a dropper would let droplets to exit. See again FIG. 13*f*.

The invention claimed is:

1. Kit comprising:
- a deformable container for dispensing a medical substance, the deformable container comprising a body defining an internal volume to receive a fluid substance, said body comprising;
  - a filling access to receive the fluid substance for filling the internal volume of the body;
  - a dispensing outlet to dispense, from the internal volume, an amount of the fluid substance;
  - a valve arranged at the filling access and movable between:
    - an open configuration wherein said valve allows fluid passage through said filling access, and
    - a closed configuration wherein said valve prevents fluid passage through said filling access;

wherein the body comprises an elastically deformable wall delimiting the internal volume; and
- a connecting accessory comprising:
  - a first coupling portion to fluidly connect to the filling access of the deformable container, and
  - a second coupling portion to fluidly connect to an internal compartment of a vial,
  - an internal passage putting the first coupling portion in fluid communication with the second coupling portion and vice versa, the kit being configurable in a coupled configuration wherein:
- the first coupling portion of the connecting accessory is coupled to the filling access of the container, and
- the valve of the container is in the open configuration so that the internal volume of the container is in fluid communication with the second coupling portion of the connecting accessory and the internal volume of the container is in fluid communication with the compartment of the vial;

wherein the container further comprises a dispensing accessory configured to dispense the fluid substance housed in the internal volume, the dispensing accessory comprising a dropper connected to the dispensing outlet, wherein the dropper comprises a housing and an internal membrane arranged inside the housing the acting as a valve for dispensing discrete drops of the fluid substance, wherein said membrane is movable between:

a sealing position, wherein the membrane prevents fluid communication between the internal volume of the container and the dispensing outlet, wherein the fluid substance is prevented from exiting through the dispensing outlet of the container, and a delivery position, wherein the membrane allows fluid communication between the internal volume of the container and the dispensing outlet, wherein a discrete amount of fluid substance is allowed from exiting through the dispensing outlet of the container.

2. The kit of claim 1, wherein in the coupled configuration:

the first coupling portion of the connecting accessory abuts against the valve of the container, the valve of the container is deformed by the first coupling portion of the connecting accessory thereby moving from the closed position to the open position, and the connecting accessory is fluidly interposable between the deformable container and the vial.

3. The kit of claim 1, wherein the valve of the container is a self-sealing valve configured to keep the closed position in a rest condition, the valve is configured to move from the closed position into the open condition when a connecting accessory couples to the filling access of the deformable container, and wherein:

a connection between the filling access and the connecting accessory determines a switch of the valve from the closed position to the open position, and a disconnection between the filling access and the connecting accessory determines a switch of the valve from the open position to the closed position.

4. The kit of claim 1, wherein the elastically deformable wall delimiting the internal volume has a thickness comprised between 0.5 mm and 0.9 mm and is made of an elastic material selected between silicone, rubber, and plastic, wherein the body of the deformable container is configured to restore an original shape after being squeezed.

5. The kit of claim 1, wherein the body of the deformable container has:

an original shape at rest defining a predefined size of the internal volume, when the container is not squeezed by a user and is free of external loads;

a squeezed shape defining a reduced size of the internal volume when the body is squeezed by a user, wherein the reduced size of the internal volume is smaller than the predefined size of the internal volume;

and wherein the elastically deformable wall of the container is configured to elastically return from the squeezed shape to the original shape after a user releases the body from squeezing.

6. The kit of claim 1, wherein the valve is arranged inside the filling access which defines a collar entirely surrounding said valve and having a rigid rim defining an access towards an inside of the filling access, the valve closing the access and comprising an elastically deformable member which determines the passage between the closed and the open position, wherein the deformable member of the valve has a slit, said slit opening fluid passage upon coupling of the filling access to a connecting accessory, and closing fluid passage when the filling access is disconnected, wherein the member of the valve is configured to deform when the filling access is coupled to the connecting accessory, said deformation causing the slit to open, wherein the valve is configured to be pressed by the connecting accessory when the filling access is coupled to the connecting accessory.

7. The kit of claim 1, wherein the body of the container has a cylindrical shape and extends in length along a longitudinal axis and in width along a transversal axis, wherein the body of the container has a length comprised between 30 mm and 60 mm, and a width or diameter comprised between 10 mm and 15 mm.

8. The kit of claim 1, wherein the body of the container comprises a first end portion carrying the filling access, a second end portion carrying the dispensing outlet, and a lateral wall interposed between said first end portion and said second end portion, wherein the filling access and the dispensing outlet are opposite each other with respect to the lateral wall of the body of the container.

9. The kit of claim 8, wherein the body defines a longitudinal axis extending along a length of the body and parallel to the lateral wall, the dispensing outlet and the filling access being aligned to each other along an axis parallel or coincident to said longitudinal axis of the body.

10. The kit of claim 1, wherein the internal volume of the container is comprised between 3 ml and 15 ml, the container being a plastic multi-dose squeeze container, wherein the dispensing outlet is configured to dispense a plurality of discrete amounts in volume of fluid solution deliverable at discrete time intervals at respective user requests and wherein the internal volume of the body is larger than each discrete amount in volume dispensed each time by the dispensing outlet, the internal volume allowing to dispense from 5 to 500 discrete amounts in volume.

11. The kit of claim 1, wherein the dispensing accessory further comprises an elastic member biasing against the membrane to maintain the sealing position, wherein said elastic member is configured to allow the membrane switching from the sealing position to the delivery position based on a predefined pressure within the internal volume of the container.

12. The kit of claim 1, wherein:

the filling access of the container comprises a threaded coupling portion, and the first coupling portion of the connecting accessory comprises a respective threaded coupling portion for connection to the threaded coupling portion of the filling access of the container, or the filling access of the container and the first coupling portion of the connecting accessory comprise snap on couplings to allow mutual coupling thereof.

13. The kit of claim 1, wherein the filling access of the container comprises a female Luer connector, and the first coupling portion of the connecting accessory comprises a respective male Luer connector for connection to the female Luer connector of the filling access of the container, wherein the male Luer connector of the first coupling portion of the connecting accessory comprises a protrusion that enters a rigid rim of the filling access and abuts, when in the coupled configuration, against the valve of the filling access of the container causing the valve to move in the open position.

14. The kit of claim 1, wherein the second coupling portion of the connecting accessory comprises:

a hollow needle for connection to the vial, wherein the connecting accessory defines a fluid passage through the needle, the internal passage, and the first and second coupling portions;

a collar configured to couple to a respective portion of the vial to mechanically constrain the connecting accessory to the vial, wherein the collar of the second coupling portion externally surrounds the needle and the needle is completely surrounded by the collar of the second coupling portion of the connecting accessory;

wherein the collar of the second coupling portion of the connecting accessory defines a snap-on coupling for connection to the vial, and comprises two or more flexible walls or fingers configured to expand outwardly during coupling of the second coupling portion to the vial;

wherein the first coupling portion, the second coupling portion and the internal passage are aligned along a connecting axis.

15. The kit of claim 1, wherein the connecting accessory is in a single piece made of plastic, alternatively wherein the first coupling portion, the second coupling portion and the internal passage are made of plastic and the needle is made of metal.

16. The kit of claim 1, comprising the vial defining a compartment for containing a substance, said kit being configurable in an assembled configuration wherein:

the deformable container and the connecting accessory are in the coupled configuration, and the second coupling portion of the connecting accessory is connected to the vial;

wherein, in the assembled configuration, the internal volume of the deformable container is in fluid communication with the compartment of the vial through said connecting accessory, wherein the second coupling portion of the connecting accessory comprises a hollow needle for fluidly connecting the internal passage of the connecting accessory to the compartment of the vial, in said assembled configuration said needle protruding inside the compartment of the vial.

17. The kit of claim 16, wherein said vial comprises a diaphragm made of an elastic material and penetrable by the needle of the connecting accessory, and wherein in said assembled configuration the needle of the connecting accessory passes through the diaphragm of the vial, the vial containing a medical sterile product for ocular use in liquid or powder form.

18. The kit of claim 16, wherein, when in the assembled configuration, the container, the connecting accessory and the vial are aligned each other along a common axis, the kit defining a closed volume defined as a combination of the internal volume of the container, the compartment of the vial, and the internal passage of the connecting accessory, the compartment of the vial having a volume comprised between 3 ml and 15 ml comparable or equal to the internal volume of the deformable container.

19. Method for moving a fluid substance in a deformable container of a kit, the kit comprising:

a deformable container for dispensing a medical substance, the deformable container comprising a body defining an internal volume to receive a fluid substance, said body comprising:

a filling access to receive the fluid substance for filling the internal volume of the body;

a dispensing outlet to dispense, from the internal volume, an amount of the fluid substance;

a valve arranged at the filling access and movable between:

an open configuration wherein said valve allows fluid passage through said filling access, and a closed configuration wherein said valve prevents fluid passage through said filling access;

wherein the body comprises an elastically deformable wall delimiting the internal volume; and a connecting accessory comprising:

a first coupling portion to fluidly connect to the filling access of the deformable container, and a second coupling portion to fluidly connect to an internal compartment of a vial, an internal passage putting the first coupling portion in fluid communication with the second coupling portion and vice versa, a vial defining a compartment for containing a substance, the kit being configurable in a coupled configuration wherein:

the first coupling portion of the connecting accessory is coupled to the filling access of the container, and the valve of the container is in the open configuration so that the internal volume of the container is in fluid communication with the second coupling portion of the connecting accessory, wherein the internal volume of the container is in fluid communication with the compartment of the vial, wherein the container further comprises a dispensing accessory configured to dispense the fluid substance housed in the internal volume, the dispensing accessory comprising a dropper connected to the dispensing outlet, wherein the dropper comprises a housing and an internal membrane arranged inside the housing the acting as a valve for dispensing discrete drops of the fluid substance, wherein said membrane is movable between:

a sealing position, wherein the membrane prevents fluid communication between the internal volume of the container and the dispensing outlet, wherein the fluid substance is prevented from exiting through the dispensing outlet of the container, and a delivery position, wherein the membrane allows fluid communication between the internal volume of the container and the dispensing outlet, wherein a discrete amount of fluid substance is allowed from exiting through the dispensing outlet of the container;

said kit being configurable in an assembled configuration wherein:

the deformable container and the connecting accessory are in the coupled configuration, and the second coupling portion of the connecting accessory is connected to the vial;

and wherein in the assembled configuration the internal volume of the deformable container is in fluid communication with the compartment of the vial through said connecting accessory;

said method comprising:

connecting the filling access of the deformable container to the first coupling portion of the connecting accessory determining a deformation of a deformable member of the valve of the filling access of the container, said deformation causing the valve to move in an open position to allow fluid passage;

connecting the second coupling portion of the connecting accessory to the vial to define the assembled configuration by penetrating with a hollow needle arranged at the second coupling portion of the connecting accessory, a diaphragm of the vial;

squeezing the deformable container to reduce the internal volume;

releasing the deformable container to allow elastic return of the body of the deformable container, said elastic return causing a sucking step wherein the container sucks the fluid substance from the vial to the internal volume of the deformable container;

sequentially repeating the steps of squeezing and releasing until the fluid substance is moved into the deformable container;

wherein, prior to the step of connecting the filling access of the deformable container to the first coupling portion of the connecting accessory, the valve at the filling access of the container is in a closed position and the step of connecting the filling access of the deformable container to the first coupling portion of the connecting accessory determines the valve of the filling access of the container to move in an open position to allow fluid passage.

20. Method of claim 19, wherein connecting the filling access of the deformable container to the first coupling portion of the connecting accessory and connecting the second coupling portion of the connecting accessory to the vial to define the assembled configuration cause the compartment of the vial to be in fluid communication with the internal volume of the deformable container through the connecting accessory.

21. Method of claim 19, wherein:

when the container is initially empty, the step of manually squeezing the deformable container determines passage of gas or air from the internal volume of the container to the compartment of the vial, thereby increasing pressure in the vial;

when the container initially contains a medical liquid, i.e. a saline solution or sterile water, the step of manually squeezing the deformable container determines passage of said medical liquid from the internal volume of the container to the compartment of the vial;

when the container initially contains a medical liquid and the vial initially contains a powder of a substance or another concentrated liquid, the step of manually squeezing the deformable container determines passage of said medical liquid from the internal volume of the container to the compartment of the vial thereby mixing in said compartment the medical liquid with said powder of substance or concentrated liquid, said mixing generating the fluid substance.

22. Method of claim 19, wherein, during the step of manually squeezing the deformable container to reduce the internal volume, the method comprises a step of arranging the deformable container above the vial, and wherein, during the step of releasing the deformable container to allow elastic return of the body of the deformable container, the method comprises a step of arranging the vial above the deformable container.

23. Kit comprising:

a deformable container for dispensing a medical substance, the deformable container comprising a body defining an internal volume to receive a fluid substance, said body comprising:

a filling access to receive the fluid substance for filling the internal volume of the body;

a dispensing outlet to dispense, from the internal volume, an amount of the fluid substance;

a valve arranged at the filling access and movable between:

an open configuration wherein said valve allows fluid passage through said filling access, and a closed configuration wherein said valve prevents fluid passage through said filling access;

wherein the body comprises an elastically deformable wall delimiting the internal volume and a connecting accessory comprising:

a first coupling portion to fluidly connect to the filling access of the deformable container, a second coupling portion to fluidly connect to an internal compartment of a vial, and an internal passage putting the first coupling portion in fluid communication with the second coupling portion and vice versa;

the kit being configurable in a coupled configuration wherein:

the first coupling portion of the connecting accessory is coupled to the filling access of the container, and the valve of the container is in the open configuration so that the internal volume of the container is in fluid communication with the second coupling portion of the connecting accessory and the internal volume of the container is in fluid communication with the compartment of the vial, wherein the internal volume of the container comprises between 3 ml and 15 ml, the container comprising a plastic multi-dose squeeze container, wherein the dispensing outlet is configured to dispense a plurality of discrete amounts in volume of fluid solution deliverable at discrete time intervals at respective user requests and wherein the internal volume of the body is larger than each discrete amount in volume dispensed each time by the dispensing outlet, the internal volume allowing to dispense from 5 to 500 discrete amounts in volume.

24. The kit of claim 23, wherein the container further comprises a dispensing accessory to dispense the fluid substance housed in the internal volume, the dispensing accessory comprises a dropper connected to the dispensing outlet.

25. The kit of claim 24, wherein the container is a plastic multi-dose squeeze container and the dispensing outlet is configured to dispense a plurality of discrete amounts in volume of fluid solution deliverable at discrete time intervals at respective user requests, the dropper comprising a housing and an internal membrane arranged inside said housing and acting as a valve for dispensing discrete drops of the fluid substance, wherein said membrane is movable between:

a sealing position, wherein the membrane prevents fluid communication between the internal volume of the container and the dispensing outlet, wherein the fluid substance is prevented from exiting through the dispensing outlet of the container, a delivery position, wherein the membrane allows fluid communication between the internal volume of the container and the dispensing outlet, wherein a discrete amount of fluid substance is allowed from exiting through the dispensing outlet of the container.

* * * * *